(12) United States Patent
Ramadass et al.

(10) Patent No.: US 9,112,894 B2
(45) Date of Patent: Aug. 18, 2015

(54) REAL TIME DISTRIBUTED NETWORK MONITORING AND SECURITY MONITORING PLATFORM (RTD-NMS)

(75) Inventors: Sureswaran Ramadass, Penang (MY); Ahmed Mansour Manasrah, Penang (MY)

(73) Assignee: Universiti Sains Malaysia, Penang (MY)

( * ) Notice: Subject to any disclaimer, the term of this patent is extended or adjusted under 35 U.S.C. 154(b) by 379 days.

(21) Appl. No.: 13/145,879

(22) PCT Filed: Dec. 31, 2009

(86) PCT No.: PCT/MY2009/000221
§ 371 (c)(1),
(2), (4) Date: Jul. 22, 2011

(87) PCT Pub. No.: WO2010/128841
PCT Pub. Date: Nov. 11, 2010

(65) Prior Publication Data
US 2012/0124200 A1    May 17, 2012

(30) Foreign Application Priority Data
May 8, 2009    (MY) .............................. PI 2009 1866

(51) Int. Cl.
*G06F 15/16* (2006.01)
*H04L 29/06* (2006.01)
*H04L 12/24* (2006.01)

(52) U.S. Cl.
CPC ......... *H04L 63/1408* (2013.01); *H04L 41/0213* (2013.01); *H04L 63/0227* (2013.01)

(58) Field of Classification Search
CPC . H04L 43/0876; H04L 43/16; H04L 63/1408; H04L 41/0213; H04L 43/08
USPC .......... 370/229, 401, 252; 455/424; 709/203, 709/224, 220; 726/1, 22; 718/1
See application file for complete search history.

(56) References Cited

U.S. PATENT DOCUMENTS

2001/0039579 A1* 11/2001 Trcka et al. ................... 709/224
2006/0146703 A1*  7/2006 Cha et al. ...................... 370/229
(Continued)

FOREIGN PATENT DOCUMENTS

WO    2004/061550 A2    7/2004

OTHER PUBLICATIONS iNet-Grid: A real-time Grid monitoring and troubleshooting system, [retrieved on Apr. 30, 2010] Retrieved from internet <URL: httQ:!/gciQortal. usrngrid.mxren. net. my/trac/nrginetiwikilWikiStart > published on Oct. 14, 2008 as per Timeline—NRG iNet—Trac See References—A. Manasrah et. al mentioned below cites M. F.Pasha et. al and A. M Manasrah et. al as mentioned in this International Search Report as its prior art.

(Continued)

*Primary Examiner* — Jungwon Chang
(74) *Attorney, Agent, or Firm* — Schmeiser, Olsen & Watts LLP

(57) ABSTRACT

A platform to support real time passive distributed network monitoring and security monitoring applications wherein the platform will use the open architecture concept for other application developers to add functionality or extend existing functionalities; wherein the platform proposes three new concepts in real time passive network monitoring and security monitoring; the 3-tier monitoring architecture; the innovative buffering technique; and the distributed passive data gathering; wherein each element has intelligence built-in to pre-process the gathered data and reduce the bandwidth consumption between the central coordination server and the distributed monitoring elements; allowing other applications to extend the platform cores through it is available APIs and extension points; and can be easily integrated into heterogeneous network environments running different operating systems due to it is cross platform nature; wherein a central coordination and monitoring server that is locally accessible by the different distributed monitoring elements.

8 Claims, 23 Drawing Sheets

(56) References Cited

U.S. PATENT DOCUMENTS

| | | | |
|---|---|---|---|
| 2007/0081467 A1* | 4/2007 | Hurst et al. | 370/248 |
| 2007/0230486 A1* | 10/2007 | Zafirov | 370/401 |
| 2008/0109870 A1* | 5/2008 | Sherlock et al. | 726/1 |
| 2008/0155537 A1* | 6/2008 | Dinda et al. | 718/1 |
| 2009/0181665 A1* | 7/2009 | Sater et al. | 455/424 |
| 2010/0050256 A1* | 2/2010 | Knapp et al. | 726/22 |
| 2010/0094990 A1* | 4/2010 | Ben-Yehuda et al. | 709/224 |
| 2010/0177646 A1* | 7/2010 | Kobayashi | 370/252 |
| 2010/0198909 A1* | 8/2010 | Kosbab et al. | 709/203 |
| 2010/0268797 A1* | 10/2010 | Pyrik et al. | 709/220 |

OTHER PUBLICATIONS

A. Manasrah et. ai, "iNet-Grid: A real-time Grid monitoring and troubleshooting system", First International Coilference on Distributed Framework and Applications, pp. 68-72, Oct. 21-22, 2008, Abstract, Figures 1-7; III-I-Net Grid Overview, IV—How I-Net Grid Works; VI—Unique Features and Objectives.

M.F.Pasha et. ai, "High Performance Network Worm Detection Engine using Memory Efficient Circular Buffer" Proceedings of the 3rd International Conference on Distributed Framework for Multimedia Applications (DFMA 2007), pp. 105-109, Paris, Jul. 4-6, 2007. see—Memory Efficient Circular Buffer (section 3) and Figures 2 and 3.

A. M Manasrah. et. al, "POSFinger: A New Fingerprint for Passive Remote Operating System Identification", Proceedings of the 3rd International Conference on Distributed Framework for Multimedia Applications (DFMA 2007), Paris, pp. 110-116,Jul. 4-6, 2007. Abstract, see—Sections 3, 4 and 5.

A. Moore et. al, "Architecture ofa Network Monitor", Proceedings of the Fourth Passive and Active Measurement Workshop (PAM 2003), Apr. 2003 Abstract.

V. Paxson, , "Bro: A System for Detecting Network Intruders in Real-Time," Proceedings of the 7th USENIX Security Symposium, San Antonio, TX, 1998 AbstraCt FOnTI.

PCT/MY2009/000221 International Search Report dated May 5, 2010.

* cited by examiner $RTDNMS\ Overhead = 1\ KB\ \times\ \#\ of\ monitoring\ elements\ generate\ alerts$ $NTOP\ Overhead\ \ \ \ = 1\ KB\ \times\ \#\ of\ SNMP\ enabled\ devices$ $OpManager\ Overhead = 1\ KB\ \times\ \#\ of\ SNMP\ enabled\ devices$ $$R_{(node,s)} = T_{(node,v)} - T_{(node,r)}$$

where, $R_{(node,s)}$ : Response Time in Seconds $By_{node}$ $T_{(node,v)}$ : Time of reply recevied by$_{node}$ in Seconds $T_{(node,r)}$ : Time of request sent by$_{node}$ in Seconds

REAL TIME DISTRIBUTED NETWORK MONITORING AND SECURITY MONITORING PLATFORM (RTD-NMS)

FIELD OF INVENTION

The present invention is a network management apparatus for security and monitoring purposes in a high speed network environment, utilizing a real time passive distributed network monitoring and security method.

SUMMARY OF THE INVENTION

A platform to support real time passive distributed network monitoring and security monitoring applications wherein the platform will use the open architecture concept for other application developers to add functionality or extend existing functionalities; wherein the platform proposes three new concepts in real time passive network monitoring and security monitoring; the 3-tier monitoring architecture; the innovative buffering technique; and the distributed passive data gathering; wherein each element has intelligence built-in to pre-process the gathered data and reduce the bandwidth consumption between the central coordination server and the distributed monitoring elements; allowing other applications to extend the platform cores through it is available APIs and extension points; and can be easily integrated into heterogeneous network environments running different operating systems due to it is cross platform nature; wherein a central coordination and monitoring server that is locally accessible by the different distributed monitoring elements.

The 3-tier monitoring architecture ensures a complete coverage of the distributed network as well as balancing the load among all distributed network monitoring elements. The innovative buffering technique handles the high speed network traffic without losing packets as well as minimizing the processing overhead. The distributed passive data gathering comes with central coordination ability with support of distributed data gathering elements.

The system can be integrated into heterogeneous network environments running different operating systems due to its cross platform nature. The architecture proposes a set of monitoring ends that are distributed among the end hosts as well as the network devices that are all reported to a central monitoring server.

The central monitoring server is in charge of managing the distributed monitoring elements in terms of configuration and function calls. The central monitoring server is also in charge of providing historical archives of a previously reported performance issues or detected event. The server takes charge of clustering the sub-network traffic and model the behavior of each sub-network within the distributed network on a daily profile base for anomaly detection facilities.

The invention includes a passive data gathering ability that provides a stealth monitoring to all real time network monitoring or security monitoring application. The invention also provides an innovative buffering mechanism that is able to handle the traffic burst during high traffic with a minimal packet loss. The invention provides a buffering structure which is a combination of a memory buffering and a ring base file buffering.

The invention contains an option that is running within each distributed network monitoring elements and also can be configured for auto start mode. The invention is an open platform that is ready for any new plug-in to be integrated into the platform without the need to redevelop the whole application through the available set of extension points, wherein the invention allows any existing service or function considered as a plug-in to be integrated into the platform that allowing a wide flexibility to the application and allow addition new functions or services smoothly.

DETAILED DESCRIPTION OF THE PRESENT INVENTION

The current developments of real time distributed network monitoring and security monitoring applications requires different tools from different vendors to be integrated together to support the application SDLC (software development life cycle). Thus, the RTDNMS platform designed to assists the emerging real time distributed network monitoring and security monitoring applications from the following perspectives:

The need for a highly structured monitoring in a large-scale network requires a combination of many, possibly heterogeneous, distributed monitoring elements across the enterprise network. In such environment, the processing and correlation of the data gathered at each distributed monitoring element gives a clear view to the state of the monitored network.

Figure 1:
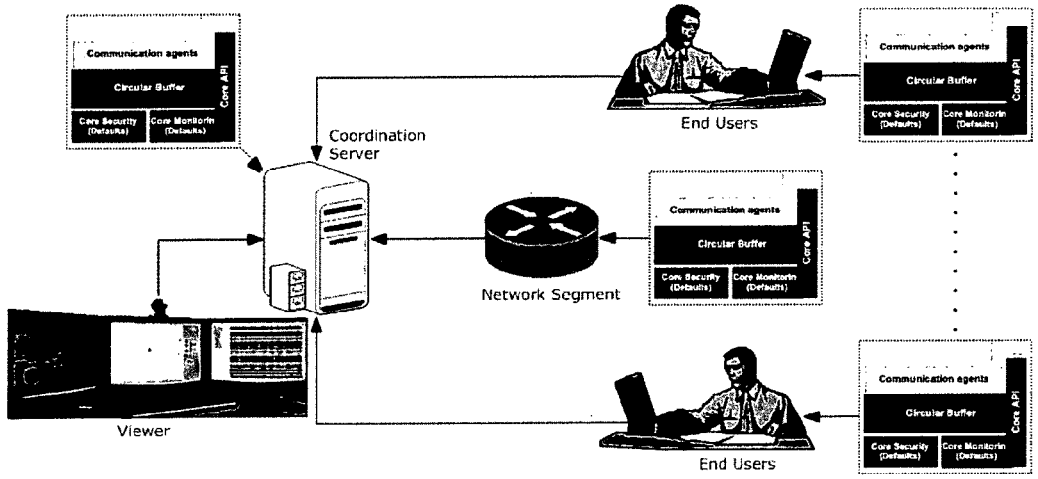
FIG. 1 shows the 3-tier distributed network monitoring architecture
Figure 2:
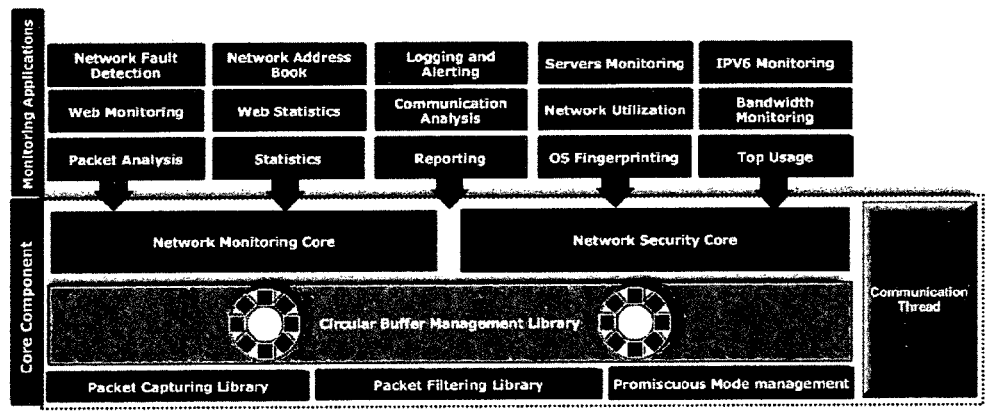
FIG. 2 shows the distributed network monitoring applications
Figure 3:
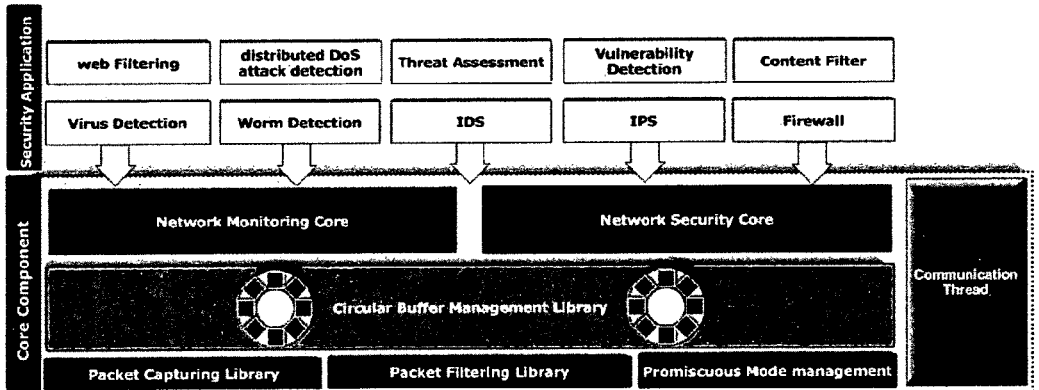
FIG. 3 shows the distributed network security monitoring applications
Figure 4:
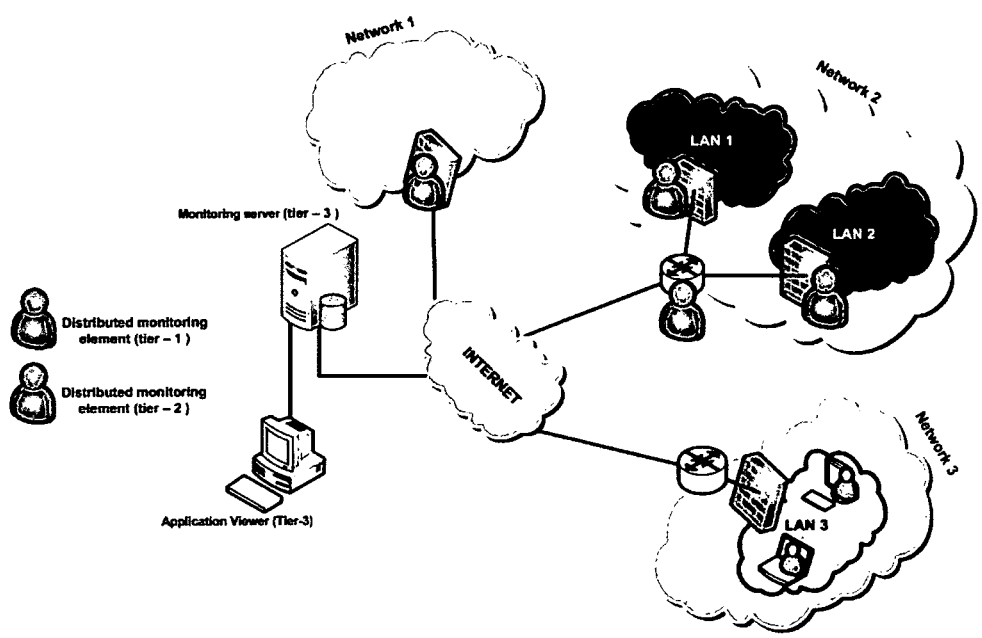
FIG. 4 shows a high-level of distributed network monitoring infrastructure

FIG. 4 illustrates a high-level view of a distributed network monitoring infrastructure. The distributed monitoring elements are distributed across the sub-networks with each sub-network having one or more distributed monitoring element(s).

The distributed monitoring elements can be used to monitor the link between the distributed sub-network and the Internet (network 1), or even the whole sub-network (network 2) or an internal sub-network nodes (network 3).

For instance, considering a distributed network monitoring application trying to read the current network bandwidth utilization, whereby all the measured bandwidth utilization is kept in a database that resides on a data server and the application resides on a client machine. If the network administrator places a request to the server, it triggers a query to the database which responds with all bandwidth utilization results. In this example, the data server also acts as the database that is based on SQL queries and as for the client application it requests and receives the data to be presented.

The example above is feasible for small network, but not for enterprise network because the database server needs to serve large number of queries for the client applications to manipulate. The data server has to serve-up these queries. This is an enormous drain on network resources. As a result, a third tier is required which can be achieved by inserting another layer at the server level known as the server application. Thus, client applications no longer directly query the database but they query the server application instead which in turn queries the data server. It is a longer process but it is much faster because instead of serving up an entire record set which has to be passed over a network, the server application is serving up a single query.

Figure 5:
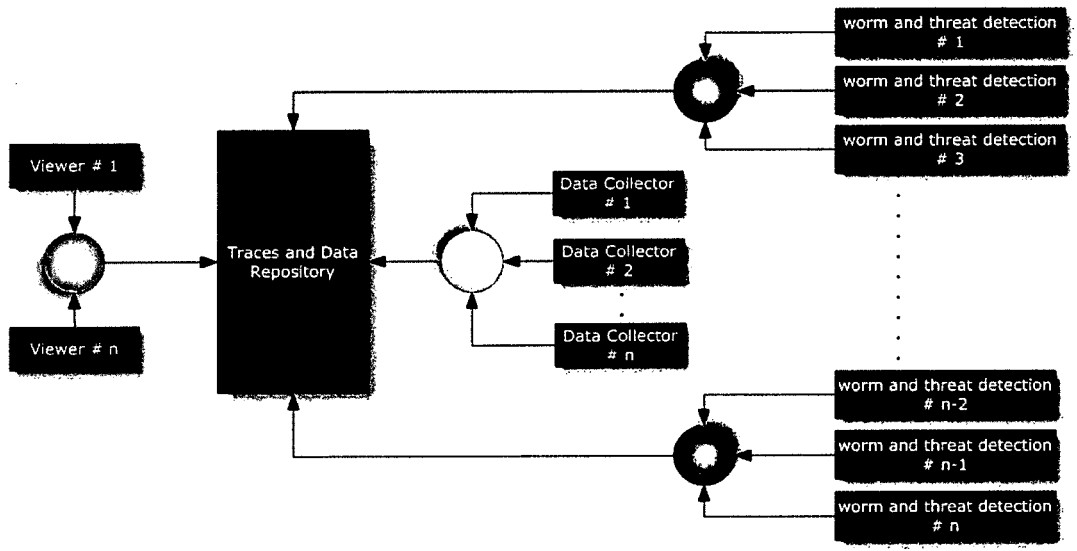
FIG. 5 shows the RTDNMS 3-tier real time distributed monitoring architecture

In a real time distributed network monitoring and security monitoring applications, the 3-tier architecture helps in distributing the processing load among the different distributed monitoring elements. The architecture consists of thin clients at the end users that constantly monitor the traffic for threats or other security breaches. These thin clients will directly report to the central monitoring server which will save the reports into the database. Furthermore, the central monitoring server will manage and configure the distributed monitoring elements. The central monitoring server also provides a centralized persistent repository of network characteristics that can be used by different distributed monitoring applications. The second tier is the network monitoring segment which also reports to the central monitoring server. The network monitoring segment is in charge of observing each single packet passing this particular network segment, pre-processing the captured traffic according to the application needs, and report to the central monitoring server. Moreover, the network monitoring segment element is also in charge of capturing network traffic passively, extracting the header information, and compressing the results to be transferred to the monitoring application in a real time. FIG. 5 depicts the RTDNMS 3-tier real time distributed monitoring architecture.

The passive data gathering techniques is used to passively gather distributed network traffic without being noticed by the different hosts or user's application. Instead of injecting extra traffic into the distributed network, the RTDNMS platform relies on a passive data gathering techniques to avoid congesting the distributed network with unnecessary traffic. Moreover, a distributed network monitoring and security monitoring applications need to be transparent to the distributed network users without degrading the performance or the distributed network quality of the service.

Figure 6:
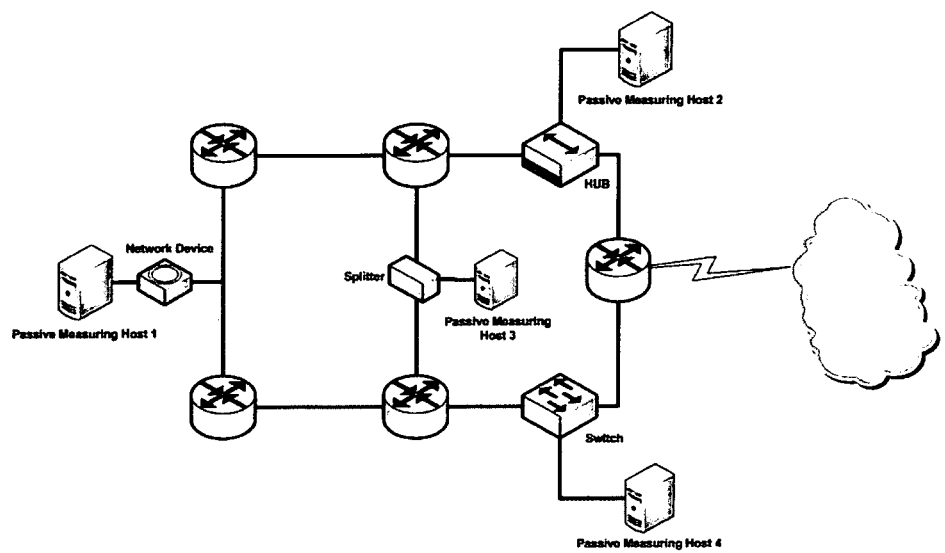
FIG. 6 shows the different configuration for passive data gathering

The passive data gathering has three modules; packet capturing module, reading and analysis module, and control module. The host in charge of gathering network traffic passively is known as the Passive Measuring Host (PMH). FIG. 6 depicts the different locations for passive measuring host that can be deployed in different places across the network.

1. PMH can be connected to a network link (Passive Measurements Host 1): The captured traffic is saved into the main memory or into other storage media. The probability to delay the packets is high.
2. PMH can be connected to a broadcast network device like hubs (Passive Measurements Host 2): the traffic from every link will be broadcasted. Thus, the PMH can capture all the packets transmitted through the link. Even though, this method can help in monitoring many links at the same time, but it will affect the links' bandwidth because they are sharing the same HUBs bandwidth which is limited to the processing power.
3. PMH can be connected to a network traffic splitter (Passive Measurements Host 3) to split the traffic signal into the PMH.
4. PMH can be connected to a switch (Passive Measurements Host 4): the PMH will be connected to a mirrored port. In this mode, the switch must support port mirroring and can forward packets in line-speed.

Data gathering is carried out by means of distributed monitoring elements. These distributed elements will capture the distributed traffic, pre-process them and return the results to the monitoring application in a size of 10-15 kilo bytes result set. The pre-processing is opened for customizations, and depends on the user application requirements. Hosts within each distributed sub-network are grouped together by placing one or more distributed monitoring element within the sub-network. Each distributed monitoring element is identified by a unique identifier. Each sub-network analytical results are kept in a repository that is identified by the sub-network identifier or processed in real time. In the case of real time processing, the amount of traffic could be enormous. As a result, the processing overhead will increase accordingly. Therefore, a buffering technique is needed to handle the traffic bursts, and to support both the distributed network monitoring architecture and the passive data gathering.

To avoid the processing overhead on the NIC driver and to minimize the driver modifications, a buffering mechanism is needed to accommodate the speed of the packets arrival without being under the risk of losing packets.

Network monitoring tools need to be fast in triggering alerts in case of anything behaving abnormally in the distributed network. Therefore, the monitoring tool needs to be:

Efficient and fast in processing distributed network traffic.
Light enough and able to handle the load peak that might occur frequently in the distributed network.

Consequently, the RTDNMS platform uses a combination of memory buffering and a file base ring buffering techniques to handle 10/100/1000 Mbps network traffic with minimal packet loss. Within the RTDNMS platform, the processing depends on the availability of the packets in the buffer space.

Figure 7:
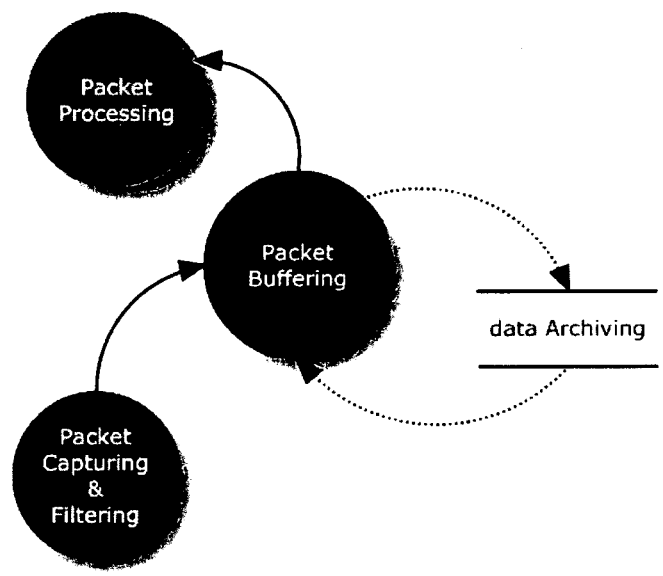
FIG. 7 shows RTDNMS platform processing stages

The processing load is distributed among different component within the distributed network monitoring and security monitoring system. Control processing is not introduced; accept for the I/O operation during the logging or archiving action, which is controlled by a file management thread. The RTDNMS platform includes three processing stages: Packet capturing, Packet Buffering, Packet Processing. FIG. 7 depicts the RTDNMS platform stages.

The RTDNMS platform design also enables monitoring applications to run independently from the monitoring application host. The RTDNMS platform consists of core components and default services. The core components provide the main functions to the distributed network monitoring and security monitoring applications. On the other hand, the default services provide services towards the emerging real time distributed network monitoring and security monitoring application. These services considered essential for any real time distributed network monitoring and security monitoring application. These Services are open for customization through a set of extension points.

Figure 8:
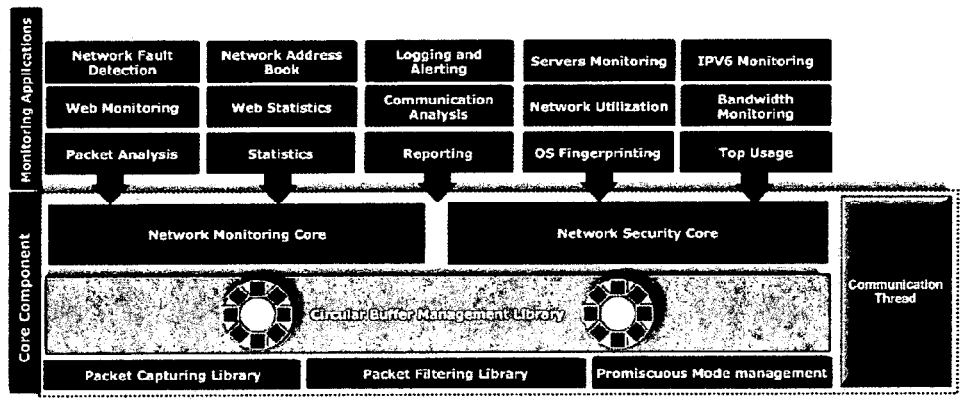
FIG. 8 shows RTDNMS platform reference architecture

The RTDNMS platform provides the fundamental requirements for monitoring and securing any network by means of its core components and default services. FIG. 8 shows the main components of the RTDNMS platform and how the various real-time distributed monitoring applications can utilize the platform.

The platform core components are implemented in the user-level address space, because:
1. It leads for faster implementation.
2. It is more robust, due to the fault isolation. Since any fatal issue would only crash the process rather than shutting down the whole system.

The RTDNMS platform core components are divided into:
1. Libraries: to provide a suitable abstraction that is simple and powerful for expressing complex and diverse monitoring needs. A good API should hide the complexity of the underlying functions and ensures the exploitation of any new feature or special functions; and
2. Network monitoring and Security monitoring cores (default services). These cores will provide a set of default services towards efficient distributed network monitoring and security monitoring.

The packet capturing library has an exclusive access to the NIC via Winpcap/libpcap. It also provides a set of functions to initiate the packet capturing process through a set of function calls. The Captured packets are verified against the defined filters by the capturing thread. Verified packets are than saved into the shared innovative buffering structure by means of the management buffering functions. The buffering structure can be seen as a combination between two circular memory buffers, and a ring based file buffer to accommodate the traffic bursts. The RTDNMS platform core component contains two main functional threads:
1. The capturing and filtering thread.
2. And the controls thread (communication thread).

Figure 9:
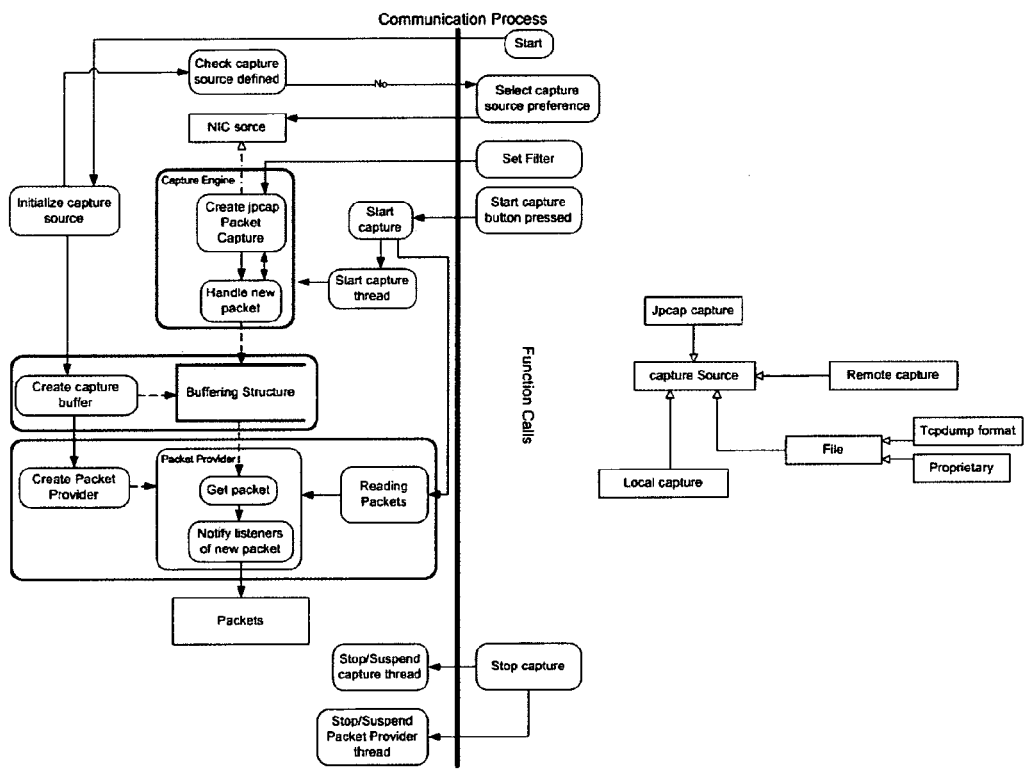
FIG. 9 shows RTDNMS platform core components state diagram

Distributed network monitoring and security monitoring applications developers can easily develop a new plug-in to the RTDNMS platform utilizing the available extension points. These extension points ensure a secured and controlled integration of the new plug-in to the RTDNMS platform. All the communications between the monitoring applications and the core components are handled by the control thread (communication thread) that constantly listens to the monitoring applications requests through RTDNMS function calls. For instance, when the monitoring application requests for the captured packets, the communication thread will initiate the capturing process and pass the results to the caller application. FIG. 9 shows a complete state diagram which demonstrates the components and the steps involved in the RTDNMS platform core components.

Figure 10:
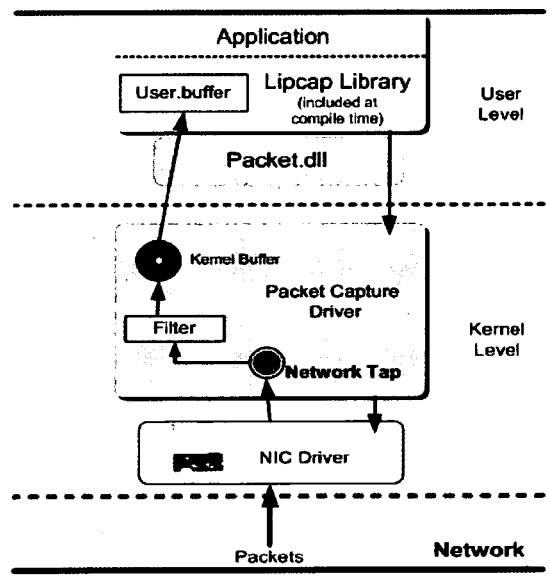
FIG. 10 shows the Packet capturing process.

The NIC captures the packets traversing the network by applying a simple filtering implemented within the NIC firmware. These filters are time-stamped and operate within the kernel memory without any further processing. The packet capturing is a low-level component that adds the ability to capture data from the network adaptor. Moreover, it provides interfaces to the various user applications to read and write data from the network. FIG. 10 shows the Winpcap packet capturing process.

Figure 11:
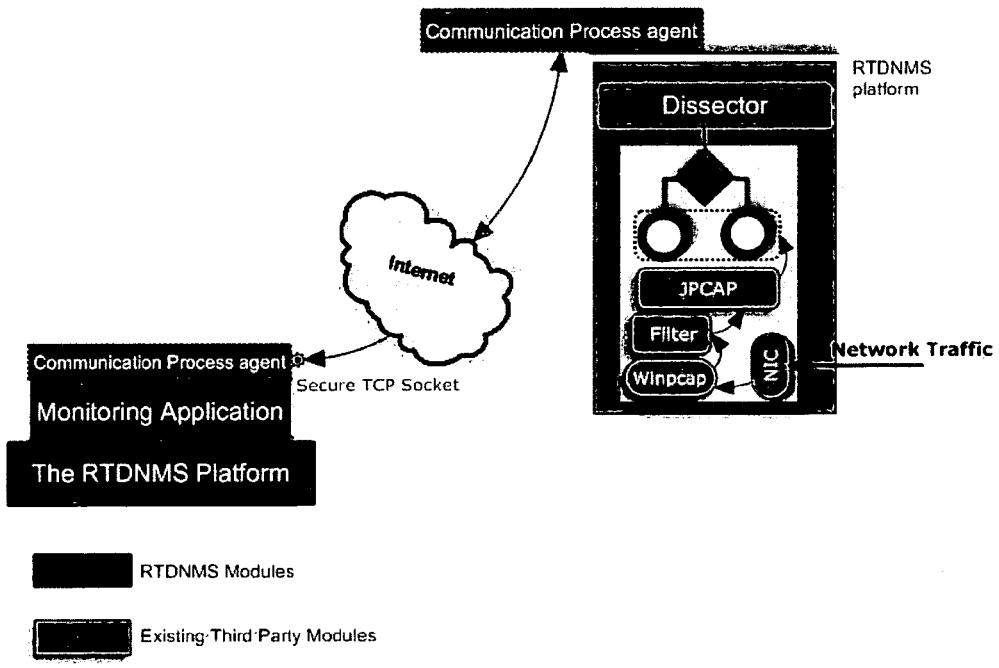
FIG. 11 shows the RTDNMS packet capturing components

To provide a system-independent capturing interface, the above design uses a dynamic link library, namely packet.dll to isolate the capturing process from the capturing driver. The packet.dll library provides a set of services to the user level application. These services include filtering and packet capturing libraries (libpcap). Libpcap also provides routines for archiving and retrieving packets. The filtering component works based on BSD packet filter. FIG. 11 illustrates the RTDNMS packet capturing components.

The captured packets are moved from the NIC buffer space to Winpcap kernel buffer. Winpcap consists of two modes; a Kernel-mode to filter certain packets and deliver them to the user-level, and a User-mode to deliver the packets to the user application to enable developers avoiding the kernel-level programming. It also, contains a set of user-level libraries that are libpcap-compatible to provide a set of cross-platform functions for packet capturing. The in-kernel capturing and filtering helps to avoid:
Copying unnecessary packets from the NIC to the user-level.
The number of calls and switches between the user-level and the kernel-level because only packets meet the filter is copied to the user-level.
Any overhead on the kernel level buffering.

Figure 12:
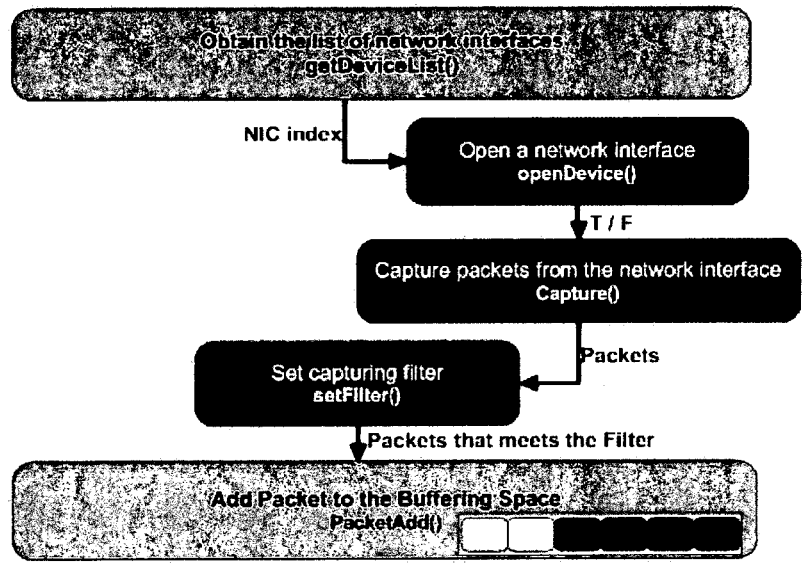
FIG. 12 shows the enhanced/modified JPCAP processing pipeline

The captured packets are then moved from Winpcap kernel buffer to the innovative buffering structure within the RTDNMS platform by means of JPCAP (Network Packet Capturing Facility). JPCAP is a set of java classes that provides an interface to the captured network packets within Winpcap kernel as FIG. 12 illustrates.

Figure 13:
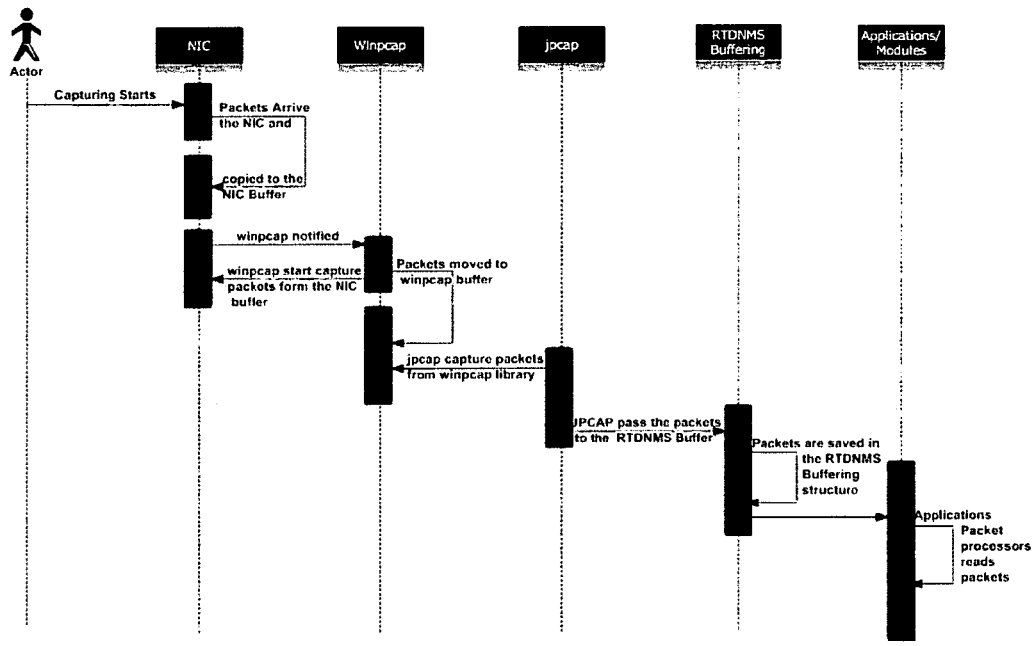
FIG. 13 shows the RTDNMS packet capturing sequence

Jpcap allows the creation, capturing, inspecting, and the manipulation of the captured packets. FIG. 13 shows the sequences and the steps involved in the packet capturing process within the RTDNMS platform.

Figure 14:
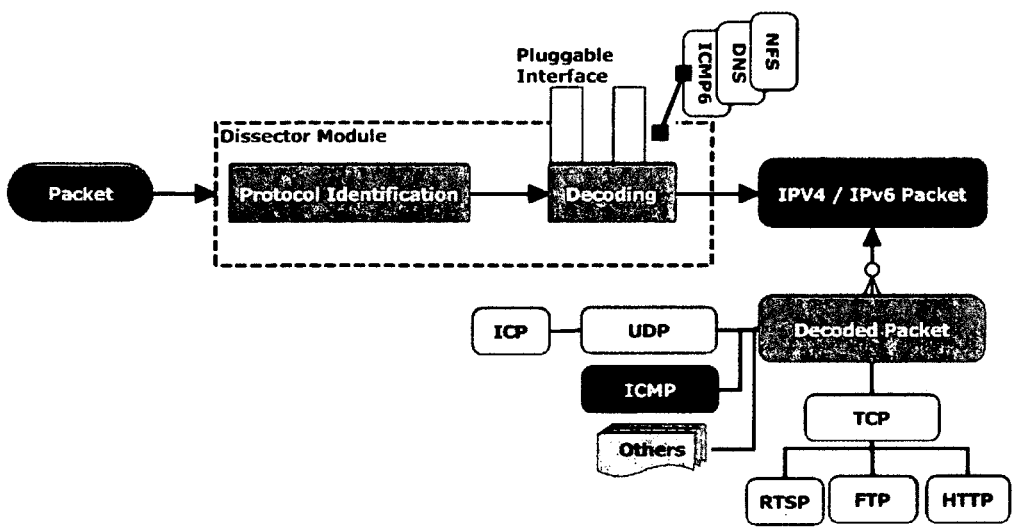
FIG. 14 shows the RTDNMS dissector module architecture

The user application now has the choice of either processing the captured packets directly from the RTDNMS buffer and/or utilizing the RTDNMS dissector module. The dissector module will extract the required data from each packet as FIG. 14 depicts. At the same time, the processed packet occupying a place in the buffer space will be freed for another packet to use. The dissector module also provides a pluggable interface to extend the dissection capability by providing a wider range of protocols to be decoded. The dissector module decodes both IPv4 and IPv6 major protocols.

The packet capturing module can run independently from the distributed monitoring application on a different host. A communication and synchronization mechanism is required to ensure the efficiency and the integrity of the capturing process. Thus, a communication process is introduced in the RTDNMS platform. The presence of the communication process is completely transparent to the distributed application which continues to operate as if they are directly connected to the capturing engine.

The communication process will:
1. Receive and manage connections from different distributed monitoring applications.
2. Return the results to the distributed monitoring applications.
3. Listen to predefined ports, synchronize the connection requests and bind each connection to their results.

Figure 15:
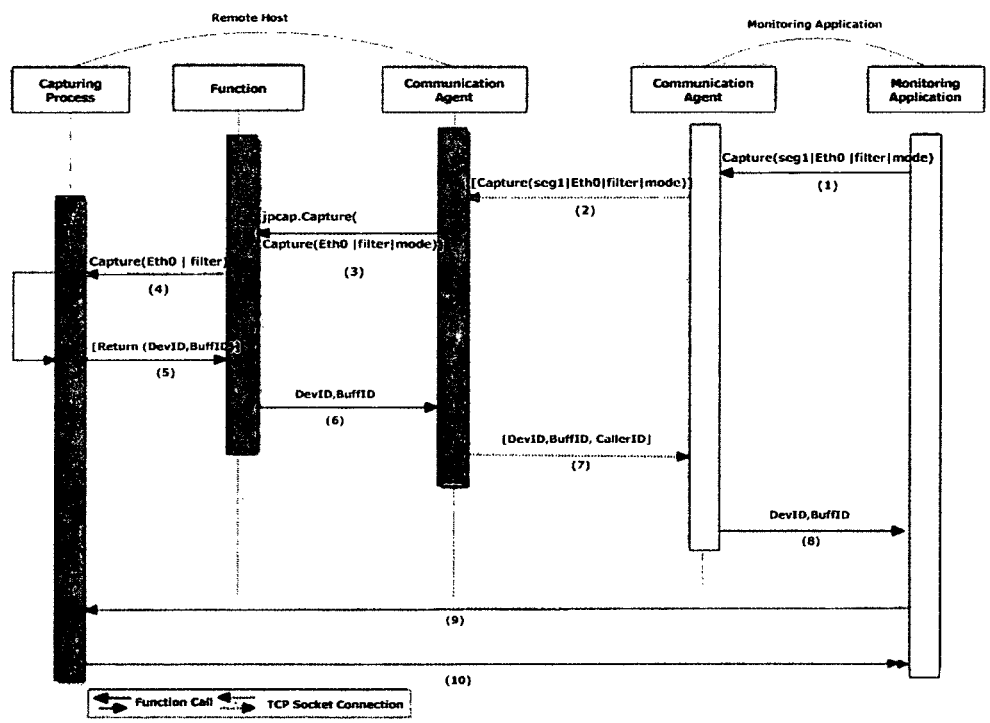
FIG. 15 shows a Remote packet capturing function call sequence diagram

For instance, FIG. 15 shows the control sequence diagram for the remote execution of the packet capturing function [Capture(seg1,eth0, filter,mode)]. The packet capturing process is initiated on a sub-network monitoring element identified as seg1 on its NIC (eth0). The captured traffic need to meet the filter string on real time mode.

Distributed application can retrieve real time packets in a form of small synchronized and compressed java objects. A careful processing must be considered, especially when data are collected from multiple distributed monitoring elements.

Figure 16:
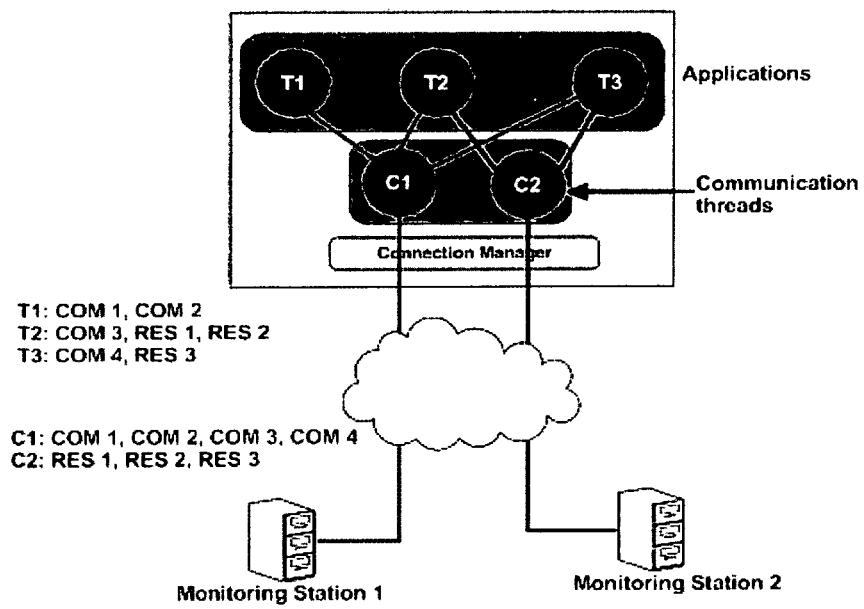
FIG. 16 shows a Multi threaded communication management

Distributed applications need to be fast enough in processing the delivered packets as soon as it arrives to avoid general performance degradation and unwise memory draining. This can be achieved by implementing a multithread listening communication process. FIG. 16 depicts an example of two monitoring applications with two control threads trying to execute the same function on the same distributed monitoring host.

The two monitoring applications will send one RTDNMS control message each to the distributed monitoring host by means of the communication process. The control. RTDNMS message is the function call to get the value of the TCP packets count. Thus, each incoming request is handled by a separate thread. These threads are in charge of receiving the results of the function calls from the remote host.

One communication thread is created per connection/request to the remote monitoring host. The pseudo-code bellow demonstrates the RTDNMS function calls to a remote monitoring host to execute the function (Funct).

Monitoring Applications:

[RTDNMS_initialise("NetworkID","eth0")]  (1)

[RTDNMS_Execute("NetworkID", Funct)]  (2)

[RTDNMS_Connection_Wait(ACK)]  (3)

[RTDNMS_Close("NetworkID","eth0")]  (4)

Monitoring Element on NetworkID:

RTDNMS_Receive_Connection("NetworkID",Funct)  (5)

RTDNMS_Execute("NetworkID", Funct)  (6)

RTDNMS_Connection_notify(!ACK)  (7)

The monitoring application initializes the RTDNMS platform on the NetworkID as in function (1). A request to execute the Function (Funct) on NetworkID is sent to the monitoring element on NetworkID as in function (2). A blocking mechanism using the ACK variable is needed to ensure locking execution as in function (3) to make sure that requests are processed in order. The monitoring element receives the request and associates it with a communication thread as in function (5). This operation is transparent to the user. The RTDNMS platform will execute the requested function and returns the results back to the monitoring application as in function (6). The semaphore value (ACK) used to release the monitoring application from the waiting state as in function (7). A request to close the connection with the monitoring application is executed to free the connection pool for others to use as in the function call in (4).

In summary, the distributed real time packet capturing module enables distributed applications to capture remote traffic in real time. The capturing engine utilizes the existing functions within the RTDNMS platform to pre-process the captured traffic to minimize the load between the distributed monitoring elements.

The communication process will manage the remote connections and the remote functions calls, especially if more than one distributed application is requesting a function from the distributed monitoring element(s). The traffic load will be handled by the innovative buffering technique as described in the following section.

Figure 17:
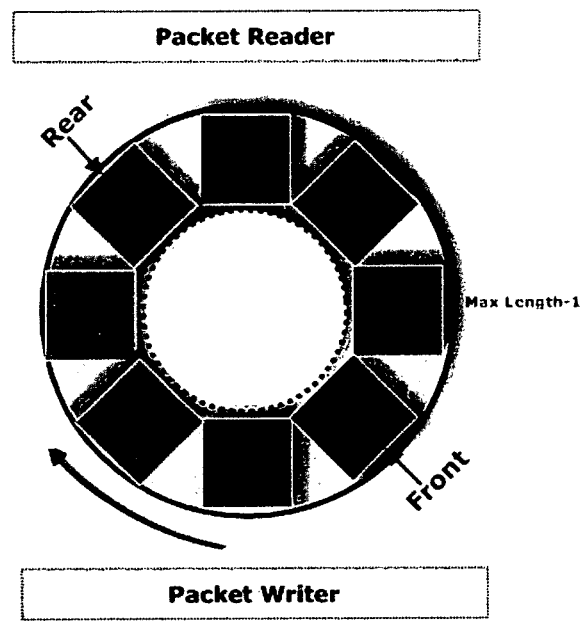
FIG. 17 shows a Single circular buffer architecture

To avoid the processing overhead on the NIC driver and to minimize the driver modifications, a buffering mechanism is required to accommodate the speed of the packets arrival without losing packets. Therefore, arriving packets need to be placed into the receiving buffer space. The buffer size is totally configurable and depends on the available main memory space. The main purpose of the buffering structure is to handle the packet arrival rates and the variable processing demands. The conventional circular buffer structure is demonstrated in FIG. 17. The RTDNMS platform uses a multi circular buffering structure that holds several advantages when compared to a conventional buffering structure from the following perspectives:

1. It ensures approximately constant-time insertion and removal of data values.
2. In addition, it also avoids the producer-consumer problem by enabling the packet analyzer to read up the packets from the circular file buffer in a smooth and efficient manner.

Figure 18:
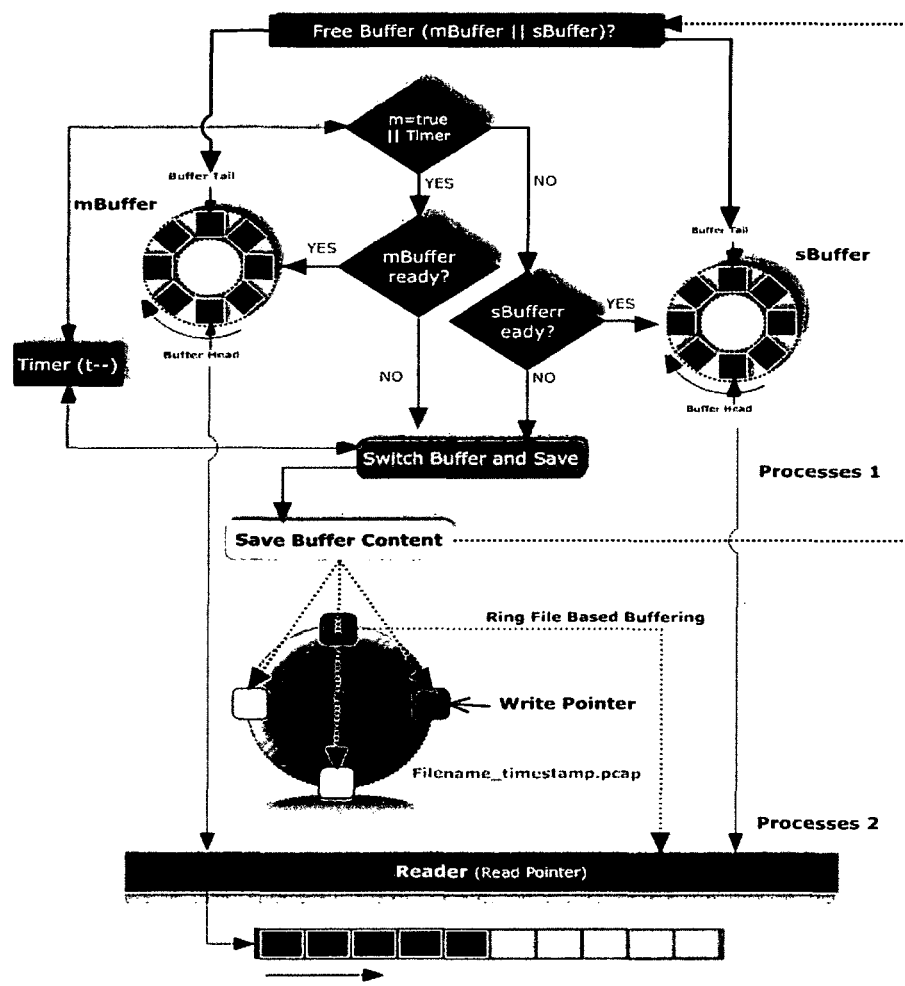
FIG. 18 shows Packets buffering process

The innovative multi circular buffer structure within the RTDNMS platform is to hold the captured packets and distribute it among the different distributed monitoring or security monitoring applications. The RTDNMS buffering structure is divided into main buffer (mBuffer) and secondary buffer (sBuffer). FIG. 18 depicts the basic architecture of the RTDNMS platform buffering structure. The packet capturing thread continuously collects data into the buffering structure. When the buffer is full, the content of the buffer is written to the ring base file buffer avoiding new data to overwrite the old data. As a result, at any point user application has a "window" of packets that can be scanned backward and forward.

This process is done concurrently with the insertion of data by the packet capturing engine. Careful calibration is done to ensure the buffer writing process is done marginally faster than the packet reader to avoid buffer overflow. Moreover, the RTDNMS platform buffering mechanisms uses the concept of "Buffer Full interrupts" where the writer and/or reader processes can both trigger a software interrupt if the buffer is full or empty. This interruption will activate the semaphore control to force the writing of the buffer content into a ring file base buffering structure. By this, it avoids the buffer overflow or initializes the buffer pointers in case the buffer is empty.

The buffering structure is controlled by a High Level Circular Buffer (HLCB) algorithm to manage the function of the circular buffer. Since synchronization has always been a very important aspect of multi-threaded structures in accessing common resources, it is necessary to make sure that the writing process is in synchronous. Thus, the RTDNMS buffering algorithm splits the activity of capturing packets and analyzing packets into two separate processes instead of using threads. Threads normally are more likely to be error prone and cannot run concurrently. The proposed circular buffer algorithm uses different operating system processes.

Hence, the racing threads issues; where the capture thread and the analyzer thread race each other to gain spot at the CPU, can be avoided.

Since the circular buffer technology uses two different processes to allow fast processing, the proposed HLCB algorithm is divided into two parts; High Level Circular Buffer for packet capturing (HLCBP) to control the first process which is part of the packet capturing process, and the High Level Circular Buffer for packet Reading (HLCBR) to enable the second process to read the packets from the circular file/memory buffer smoothly. Both HLCB algorithms prototype are presented in table 1.

TABLE 1

HLCB Algorithms

HLCBP Algorithm

Start
    Start 1 sec timer.
    Initialize the files used by the circular file buffer.
    Initialize active-file-pointer to 1
    Get packet from CaptureEngine.
    If m is true
        Dump the packet into mBuffer and set m to false.
    Else
        Dump the packet into sBuffer and set m to true.
    Every 1 sec,
    Try locking the file pointed by active-file-pointer.
    If file is locked by other process
        Wait and keep trying, and keep reading packets
    If m is false
        Dump mBuffer into the locked file.
    Else
        Dump sBuffer into the locked file.
    Unlock the file upon finish writing.
    Increase active-file-pointer by 1.
End HLCBR Algorithm Start
    Start 1 sec timer.
    Initialize active-file-pointer to 1
    Every 1 sec,
    Try locking the file pointed by active-file-pointer.
    If file is locked by other process
        Wait and keep trying.
    Open the file and read the content into Reader.
    Unlock the file upon finish reading.
    Increase active-file-pointer by 1.
End Since the packet capturing engine might face processing load in collecting the distributed traffic, the RTDNMS platform associates each distributed monitoring element with its innovative buffering structure to handle the traffic bursts. This buffering technique will utilize the ring file based buffer to avoid any packet loss. As a result, the cooperation between the memory buffering and the ring based file buffering in a distributed network makes it as one essential component for any real time distributed packet capturing and processing application. Finally, packet capturing and buffering are more ideal if the distributed elements performs certain level of packet pre-processing with support of the distributed 3-tier architecture.

Figure 19:
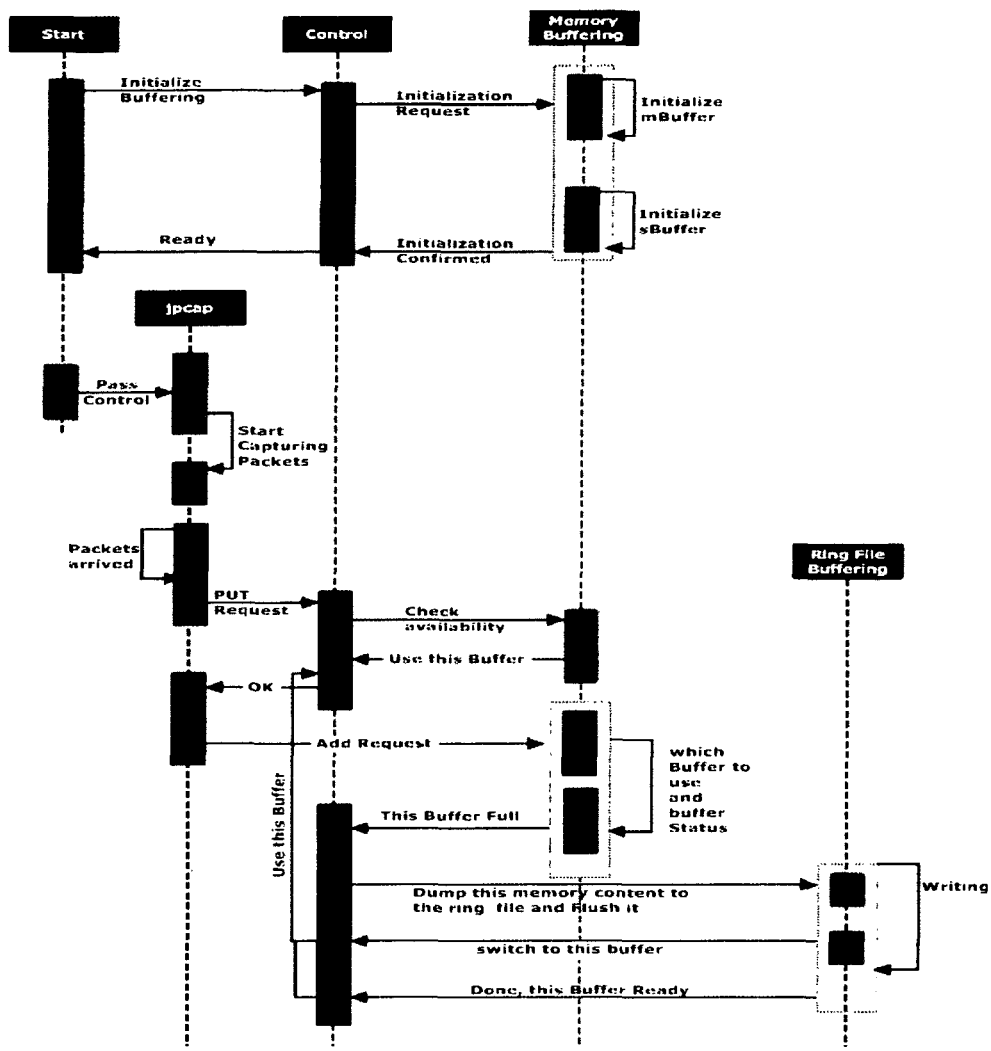
FIG. 19 shows the Buffering management: writing and reading

In summary, the RTDNMS buffering technique can be seen as a hybrid approach between memory circular buffering and a ring based file buffering to avoid any packet loss. A memory circular buffer is an efficient method for temporary storage allocation which entails the rotation of the data through an array of buffer positions. In a circular buffer, the data writer advances one step every time new data is entered into the buffer. Once the end of the buffer is reached, this process is restarted once again from the beginning. Data reading is done in the exact same manner. FIG. 19 show the sequence steps involved in writing and reading from the buffering structure.

Figure 20:
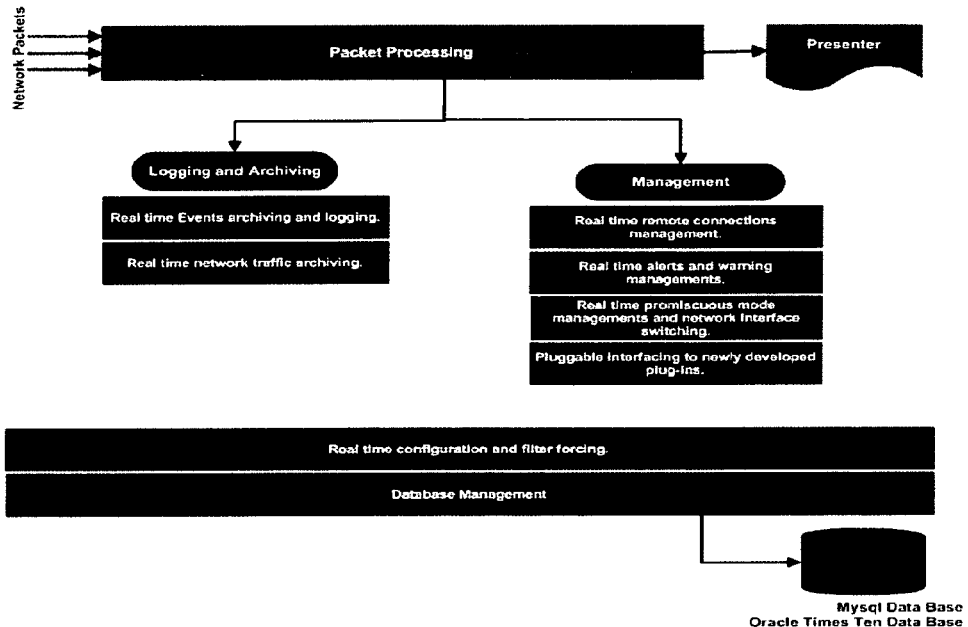
FIG. 20 shows Packet processing default functions

In the packet processing phase, the different type of real time distributed network monitoring and security monitoring applications can be developed and integrated into the whole platform. This phase provides a set of extension points for efficient integration and maximum utilization for the default functions provided by the RTDNMS platform. FIG. 20 illustrates the default functions provided by the processing phase that includes:

Logging and Archiving.
        Real time Events archiving and logging.
        Real time network traffic archiving.
    Management.
        Real time promiscuous mode managements and network interface switching.
        Real time remote connections management.
        Real time alerts and warning managements.

Figure 21:
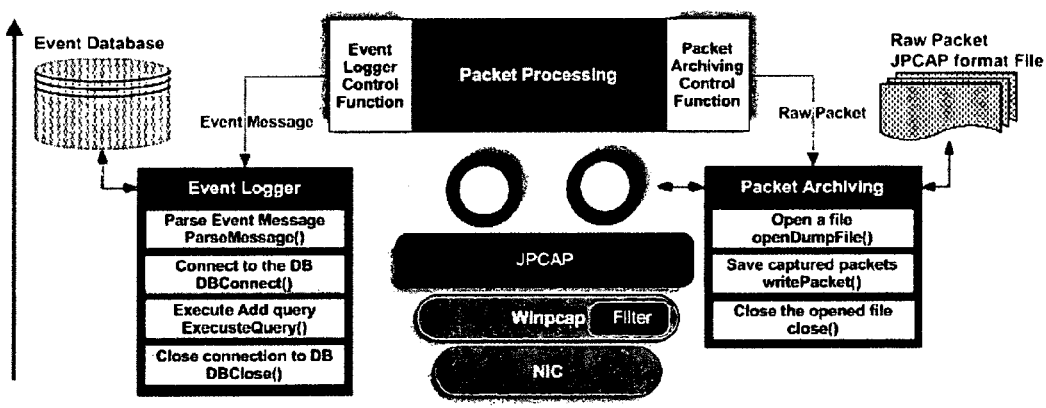
FIG. 21 shows the logging and archiving control functions
Figure 22:
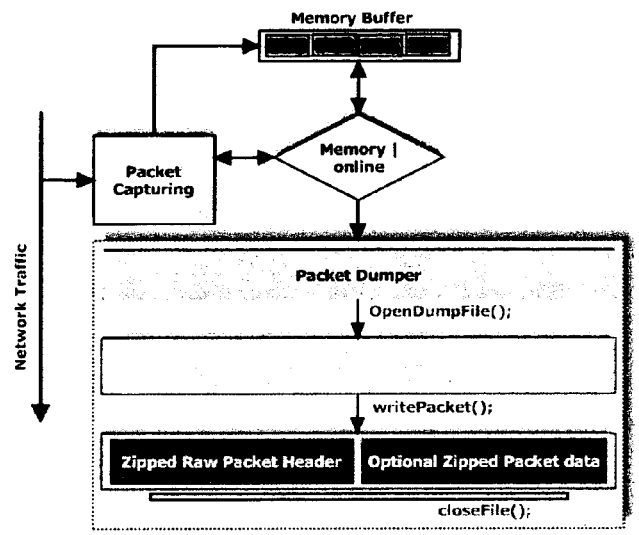
FIG. 22 shows packet archiving file structure

Since the packet processing phase is responsible for the main processing functions within the RTDNMS platform, a mechanism for event logging and traffic archiving is required by the different type of distributed real time network and security monitoring applications. Thus, the RTDNMS platform provides a set of APIs that enables both the traffic archiving and event logging mechanism. FIG. 21 depicts the basic functions for logging and archiving.

The traffic archiving is done by converting the captured traffic into an offline traffic file for later processing. The file name will follow the following naming convention:

NetworkID_sdatetime_edatetime.pcap
    Where;
    NetworkID: is the distributed sub-network identifier.
    sdatetime: is the starting date and time of the archiving process.
    Edatetime: is the ending date and time of the archiving process.

Figure 23:
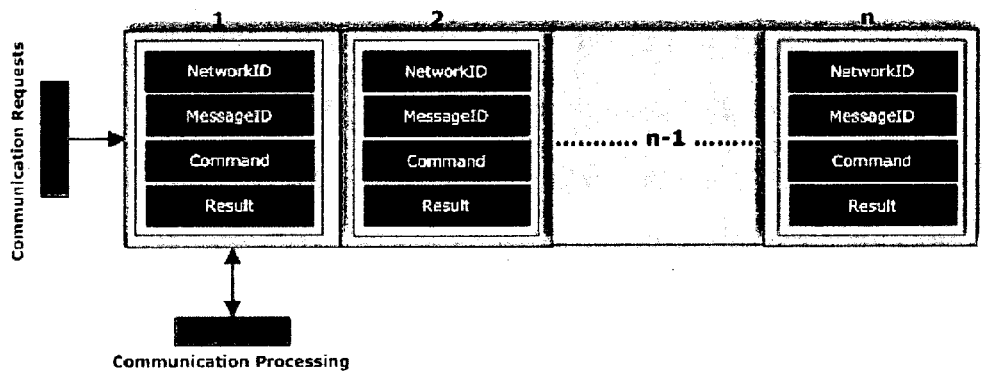
FIG. 23 shows the FCFS connection pool

The management module is responsible for managing and synchronizing the tasks of the different modules within the processing phase. For instance, the connection manager will respond immediately, to any attempted connections from the distributed monitoring elements as long as there is a space within the connection pool. The connection pool is basically a queue of FCFS base to hold the several connections in order. The queue size is by default set to 20 connections, and it is fully customizable according to the various type of monitoring applications needs as shown in FIG. 23.

Furthermore, real time distributed network monitoring and security monitoring applications need to define different types of thresholds that vary depending on their needs. For example, a threshold can be set to certain bandwidth limits for certain distributed network. Associating the bandwidth with certain optional filters is useful when monitoring specific type of traffic.

The RTDNMS platform provides a set of management APIs that will assist the real time distributed network monitoring and security monitoring applications to manage and configure the distributed monitoring elements. For example, the monitoring application can initializes the packet capturing to use one of the two main modes that are supported by the NIC itself. The promiscuous mode, where the monitoring application can capture every single packet in the wire, i.e., even if its source or destination MAC address is not same as the MAC address of the monitored interface. As for non-promiscuous mode, packets sent or received by the monitored host can be captured.

Figure 24:
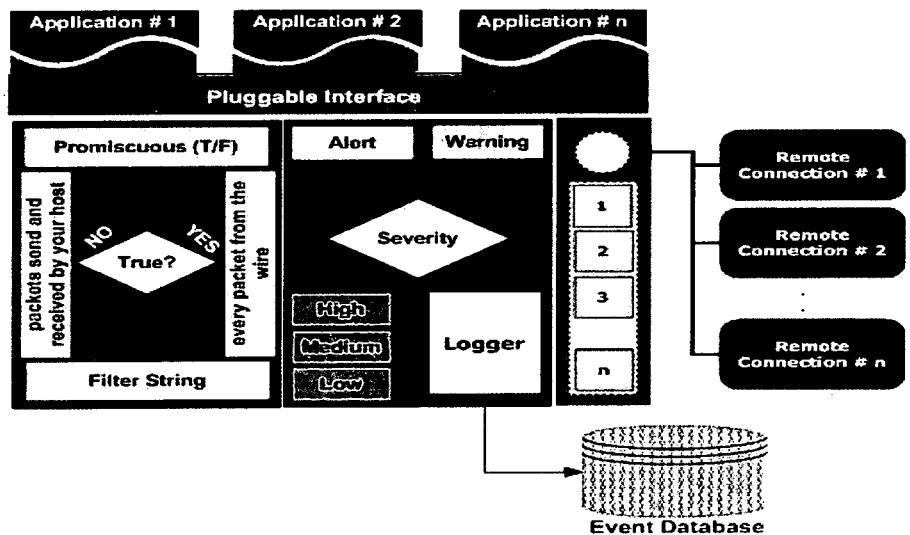
FIG. 24 shows the management modules basic functions

The management module enables the monitoring application to select the network interface to be monitored. Moreover, using this module one can set the Max number of bytes to be captured or set a capturing timeout value in milliseconds as well as real time traffic filtering. FIG. 24 illustrates the main functions of the management module.

Figure 25:
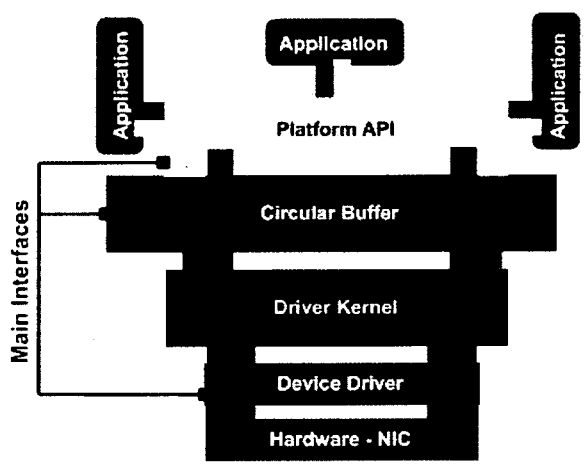
FIG. 25 shows the RTDNMS platform main interfaces

The management module also provides interfacing facilities between the device driver and the circular buffer structure through a set of APIs as shown in FIG. 25 below. The figure also shows the positioning and the relationship between the different components.

Device drivers are the programs that control the functioning of peripherals. The platform defines a standard API for network interface cards (NICs). The details of a NIC's hardware implementation is wrapped by a "Media Access Controller" (MAC) device driver in such a way that all NIC's for the same media (e.g., Ethernet) can be accessed using a common programming interface. When a NIC is inserted into the computer, it will be enumerated by the operating system (OS) hardware subsystem—i.e. a unique device number is assigned and then the device descriptor is read. Such a descriptor is a data structure which contains information about the device and its properties. For example, the descriptor is a packet descriptor and/or a buffer descriptor. Device driver will provide a library of functions that can be used by MAC drivers as well as higher level protocol drivers (such as TCP/IP) to access and manipulate those properties values.

The distributed monitoring elements as discussed earlier could be located at different distributed networks or across different administrative domains. Thus, the communication between these distributed monitoring elements and the monitoring application is one of the main factors that affect on the overall performance of the distributed network monitoring and security monitoring applications. The RTDNMS distributed monitoring architecture aims to collect as much information as possible as well as minimizing the overhead on the distributed monitoring elements. Thus, the communications between distributed monitoring elements and the monitoring applications need to be adopted with minimal overhead, which scales better over a large number of distributed monitoring elements.

Figure 26:
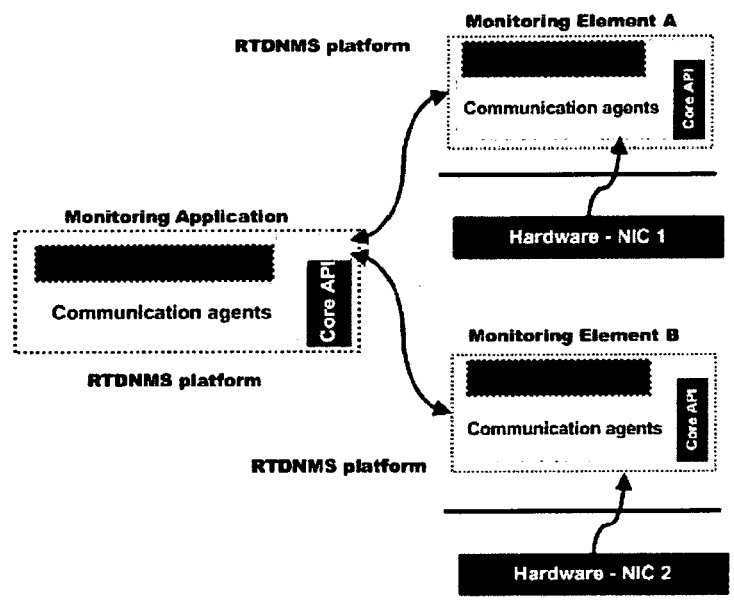
FIG. 26 shows the distributed monitoring elements communication

As a result, a communication process introduced as one of the component in the RTDNMS platform. The RTDNMS platform accepts a communication requests from the different distributed monitoring elements in a form of secured TCP socket. The communication process performs the requested operation. The sender needs to wait for acknowledgment for the successful execution of the request. FIG. 26 illustrates the communication process between the distributed monitoring element and the monitoring application.

Figure 27:
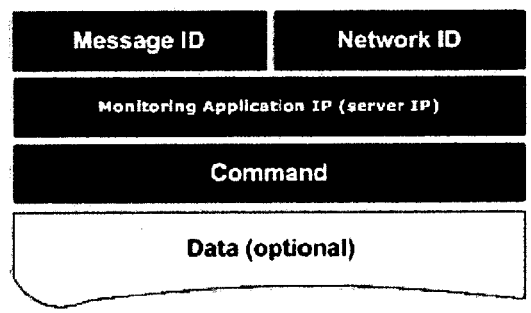
FIG. 27 show RTDNMS platform message format

The format of the message exchange between the distributed monitoring elements and the distributed monitoring application supported by the RTDNMS platform is shown in FIG. 27. The message has a variable length that determines dynamically according to the command length. The 'Message ID' is to track each message within the RTDNMS platform. The 'Network ID' is the unique identifier that identifies each distributed monitoring elements. The 'Monitoring Application IP' is where the monitoring application or the central monitoring server resides. The 'Command' field is where the distributed monitoring elements or any distributed monitoring application can request for certain commands to be executed or service to be acquired. The 'Data' filed is an optional field that might contain additional information or carry the results after executing the requested command.

Figure 28:
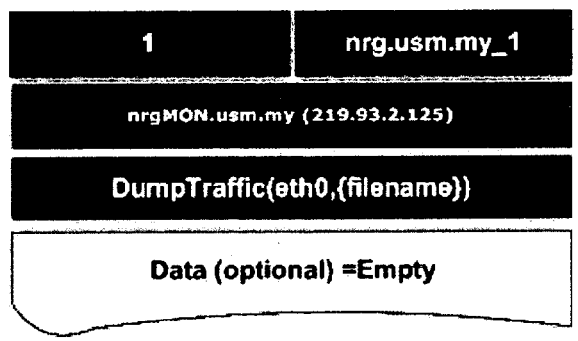
FIG. 28 shows function call message values

The communication message will contain the following values as shown in FIG. 28. The concept above is similar to the existing IPC. Indeed, whether the RTDNMS Platform used to develop distributed monitoring elements and distributed monitoring applications, or whether the monitoring element is running on the same host where the monitoring application resides, it is of no concern to the development life cycle. The details of the underlying communication mechanism are hidden from the monitoring application users. Thus, the RTDNMS platform communication protocol is completely transparent to the monitoring applications.

In summary the distributed monitoring applications depend on the amount of the collected data to create a clear view of the monitored network. A careful placement of the distributed monitoring elements for a distributed network and security monitoring is needed to be done carefully to minimize the traditional limited view of the network. Thus, a discussion on the importance of the 3-tier architecture is established to ensure the full coverage of the network. In order to collect as much information as possible in the distributed network, the RTDNMS platform proposes three levels of distributed monitoring elements.

Figure 29:
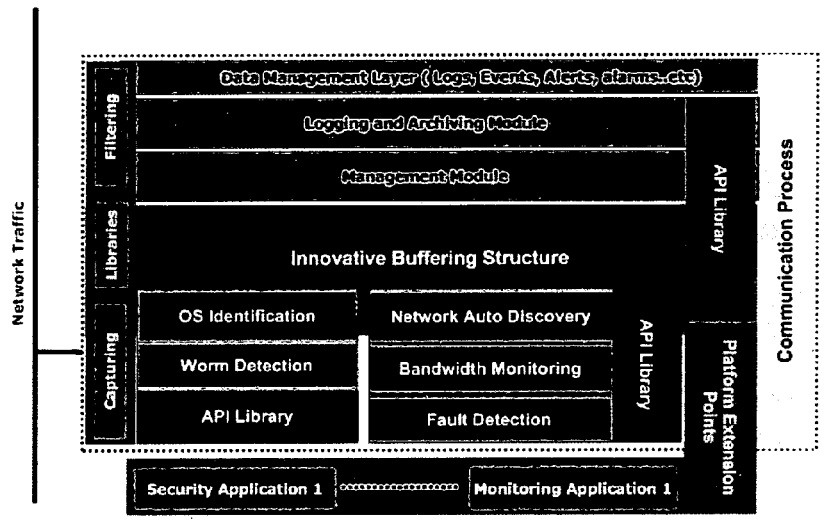
FIG. 29 shows the RTDNMS detailed architecture overview.

These distributed monitoring elements collect data passively without injecting extra traffic to the network. The passive data gathering is secured because it is transparent to the network being monitored. Moreover, each distributed monitoring element is equipped with a capturing and filtering engine to capture only traffic of interest. The innovative buffering technique is another important part within each distributed monitoring element that is designed to accommodate the traffic bursts effectively. The RTDNMS platform provides different techniques and services in performing reliable distributed network monitoring and efficient distributed network security monitoring tasks. The RTDNMS platform also provides critical information to minimize the processing load on the distributed monitoring elements and provide extension points towards building new real time distributed network monitoring and security monitoring applications. FIG. 29 depicts the architecture overview of the distributed monitoring elements.

The environment consists of two sub-networks. Sub-network 1 consists of three PCs, one Gigabit switch (3Com5000) and one network TAP/HUB (TAP/HUB 1). One PC is connected to the switch (PC-B). Two PCs are connected to the network TAP (PC-A, RTDNMS Monitoring element). The network tap splits "PC-A" traffic between the RTDNMS monitoring element and the switch. "PC-A" equipped with a 1 GHz Pentium III and used to generate traffic to "PC-B" that equipped with 2.8 GHz Pentium IV. The "monitoring element" PC is Intel(R) Core™ 2 Duo CPU E6750 @ 2.66 GHz (2 CPU) with 1 GB of main memory, with Intel® 82566DM-2 Gigabit network card. The host operating system of the monitoring element is windows XP professional (5.1 build 2600).

Figure 30:
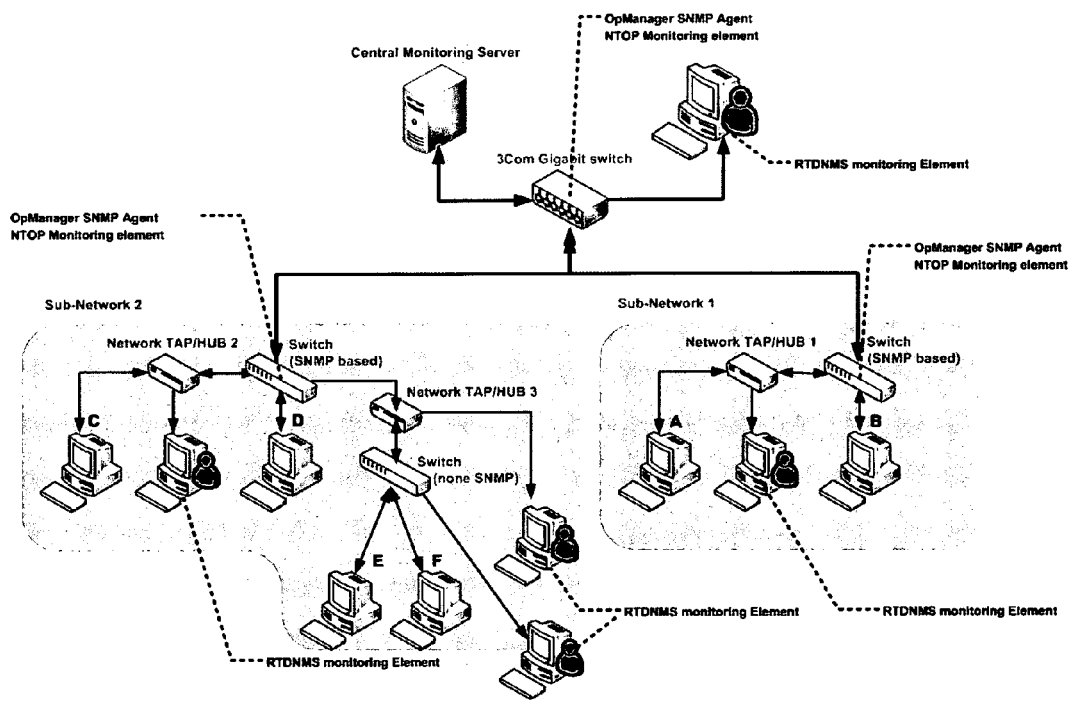
FIG. 30 shows the RTDNMS experiment environment

Sub-network 2 consists of six PCs, one Gigabit switch (3Com5000), one unmanaged switch and two network TAP/HUBs (TAP/HUB 2, TAP/HUB 3). One PC is connected to the switch (PC-D). Two PCs are connected to the network TAP/HUB 2 (PC-A, RTDNMS Monitoring element). Three PCs are connected to the unmanaged switch (PC-E, PC-F and the monitoring element PC). FIG. 30 illustrates the experiment environment.

The purpose of this experiment is to show the 3-tier distributed monitoring architecture ability in ensuring the full coverage of the distributed network. The full coverage is achieved by means of the distributed monitoring elements across the distributed network. These elements will cover the distributed network end elements as well as the core network devices. The 3-tier architecture will also minimize the network overhead. The distributed monitoring elements will notify the central monitoring server in the case of anything behalf oddly within the network. The experiment is divided into two parts: network coverage and network overhead experiments.

Figure 31:
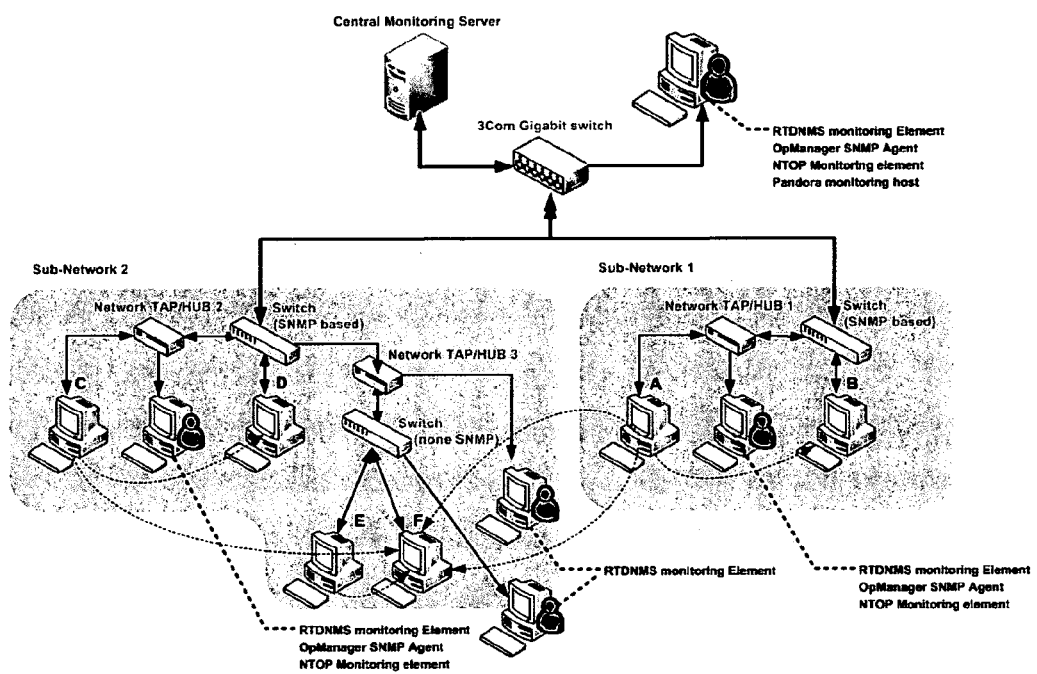
FIG. 31 shows network coverage testing environment

The purpose of this experiment is to compare the proposed 3-tier monitoring architecture in covering the distributed network traffic against "NTOP", "OpManager" and "Pandora". "NTOP", "OpManager" and "Pandora" are widely used and known in network monitoring. FIG. 31 illustrates the proposed 3-tier monitoring architecture environment setup.

We transfer a file of 1 MB from different points across the distributed network as depicted in FIG. 31. We monitor the generated traffic at different points using "NTOP", "OpManager", "Pandora" and the RTDNMS based applications. The achieved results are illustrated in table 2.

TABLE 2

Generated traffic sequence across the distributed network

| File Transfer Between | 3-Tier RTDNMS (traffic can be seen) | NTOP (traffic can be seen) | OpManager (traffic can be seen) | Pandora (traffic can be seen) |
| --- | --- | --- | --- | --- |
| A to B | Yes | Yes | Yes | Yes |
| B to A | Yes | Yes | Yes | Yes |
| A to F | Yes | Yes | Yes | Yes |
| C to D | Yes | Yes | Yes | Yes |
| D to A | Yes | Yes | Yes | Yes |
| C to F | Yes | Yes | Yes | Yes |
| F to E | Yes | No | No | No |
| E to F | Yes | No | No | No |

From the above table, we find that the file transfer traffic can be seen at various points across the network. On the other hand, "NTOP", "OpManager" and "Pandora" were unable to capture the traffic from/to PC-F to/from PC-E, where the RTDNMS based application can capture this traffic by means of it is distributed monitoring elements within the end hosts itself. "NTOP" and "OpManager" cannot capture the traffic between the two points because both are SNMP based application where the two points are connected to unmanaged switch that is none SNMP based switch. "Pandora" is deployed at a single point within the network and does not support a central monitoring; this is why "Pandora" was not able to capture this traffic, unless the whole system is deployed into the unmanaged switch. The end hosts is the 3rd tier that is not existed in "NTOP" and "OpManager" as they are able to capture the traffic passed any other managed network devices.

Since the network monitoring elements can trigger functions call to the RTDNMS platform monitoring applications via a message exchange, this poses a question regarding the overhead on the distributed network. As a result, in this experiment we will try to quantify the network overhead that the RTDNMS platform insures when used for a to distributed monitoring and security monitoring purposes. The aim is to measure the RTDNMS platform message exchange overhead when using multiple distributed monitoring elements. This application will record all the traffic coming to the server monitoring port that is used by all the distributed network monitoring elements.

Figures 32, 33:
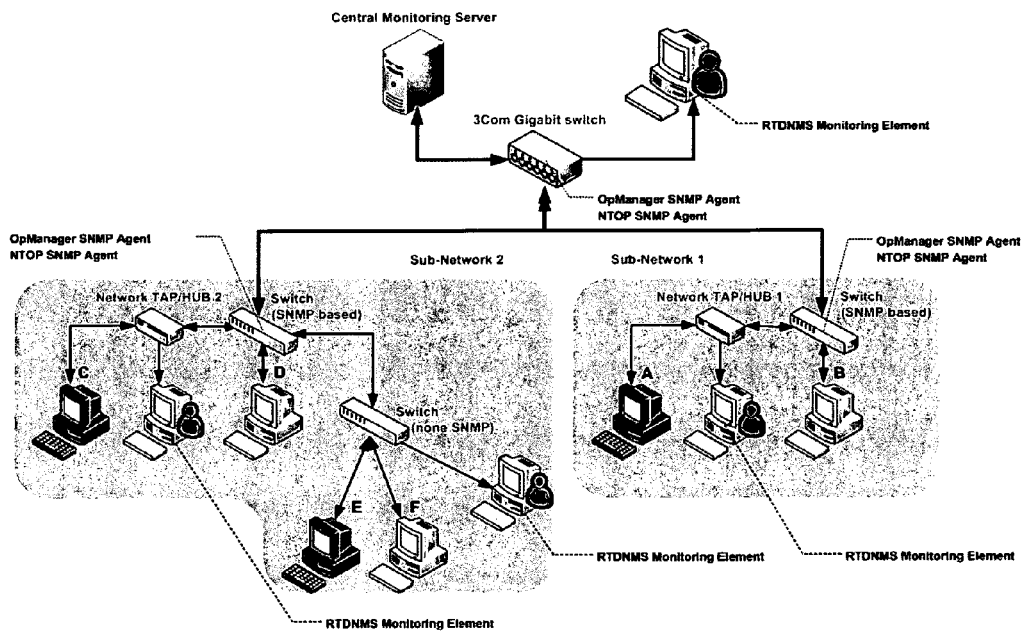
FIG. 32 shows network overhead testing environment
FIG. 33 shows the network overhead calculation formula

For this experiment we evaluated the RTDNMS network overhead and we compare the results against both "NTOP" and "OpManager" monitoring tools. Furthermore, we enabled the SNMP agents within the available switches as depicted in FIG. 32. We set the polling interval to one minute and we calculated the network overhead insures by "NTOP" and "OpManager" to perform distributed network monitoring. The results depicted in Table 3 and FIG. 33.

TABLE 3

The 3-tier monitoring architecture network overhead comparison

| Network Status | RTDNMS Normal Mode (Kbps) | NTOP (Kbps) | OpManager (Kbps) |
| --- | --- | --- | --- |
| Network without alerts | 0 | 2 | 2 |
| C Consumes more than 2 MBps | 1 | 3 | 3 |
| C and A Consumes 4 MBps | 2 | 4 | 4 |
| A, C and D consumes 5 MBps | 3 | 5 | 5 |
| E Consumes more than 2 MBps | 1 | N/A | N/A |

Figure 34:
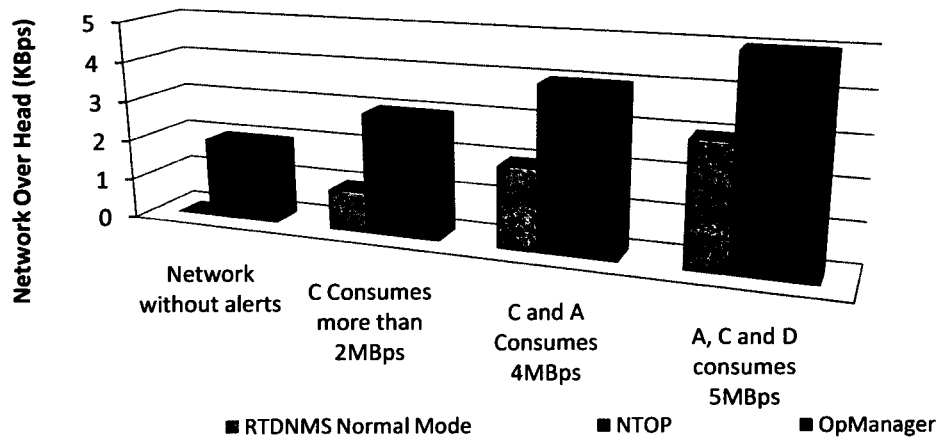
FIG. 34 shows n Network overhead results

Since the network overhead for one SNMP request is 512 bytes and another 512 bytes for the reply per interface (1 KB). "NTOP" and "OpManager" poses an overhead to the network even there is no faults or alerts generated, where RTDNMS based application consumes 1 KBps per network monitoring element that generate an alert as depicted in FIG. 34. The following equations in FIG. 33 show the resulted network overhead calculation formula.

In general, the SNMP monitoring depends on polling. Polling is the underlying basis of SNMP statistical data collection. A Network Management System (NMS) sends SNMP GET requests to network devices at pre-defined intervals (polls). For each poll, the NMS has to send a request and the target network device has to respond with the requested data. So, this causes specific network overhead. As a result, one poll for one metric to a single interface can be up to 1 KB. It may not sound critical, but multiplied by the number of the interfaces at every network device per second; we can easily identify the amount of the drained bandwidth. However, "NTOP" and "OpManager" consumes up to 5 KBps to query 3 devices for certain information where the proposed monitoring architecture uses up to 3 KBps alert to the central monitoring server.

In a distributed network environment, data are gathered by means of distributed elements across the network to reduce the bandwidth consumed and to balance the load among each other by processing the distributed information within each element. FIG. 30 depicts the concept of the 3-tier distributed architecture for distributed network monitoring and security monitoring.

Figure 35:
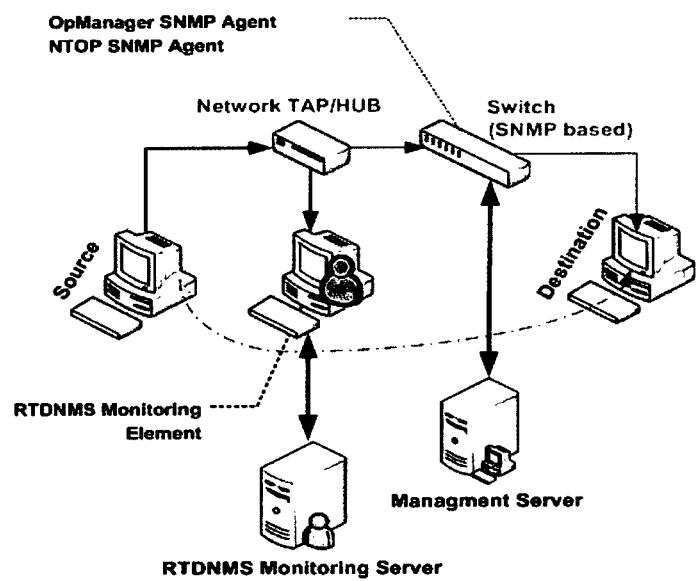
FIG. 35 shows the response time testing environment

The RTDNMS platform adopts the passive technique in gathering the distributed traffic. This technique opens a question on the response time between the monitoring server and the distributed monitoring elements across the distributed network. The response time indicates the speed of the data availability. Thus, the purpose of this experiment is to evaluate the response time between the monitoring elements and the monitoring server. Furthermore, we will compare the response time between the RTDNMS platform based application, "NTOP" and "OpManager" in responding to the query of the number of packet collected until the query received. FIG. 35 illustrates the testing environment where the three monitoring application are evaluated.

We generate a random traffic at various rates using the "Comview" packet generator from the "source" PC to the "Destination" PC. Both PCs are connected to a managed switch with SNMP enabled. The generated traffic is tapped into the RTDNMS monitoring element by means of a network TAP/HUB. The monitoring element is accessible by the monitoring server. Similarly, the switch is accessible by the management server that is ready to send an SNMP queries to the switch SNMP agent.

After the "source" PC start the traffic generation, we start the evaluation of the response time between the three monitoring application under the same conditions. The response time is calculated based on the following formula depicted in FIG. 36. The results are summarized in table 4. The response time is the time between the request query by the server to the monitoring element and the time a reply is received by the server itself.

TABLE 4

Response time evaluation result

| Kbps | RTDNMS Response (second) | NTOp Response (second) | OpManager Response (second) | Pandora Response (second) |
|---|---|---|---|---|
| 1000 | 2 | 4 | 3 | 6 |
| 2000 | 2 | 4 | 3 | 6 |
| 3000 | 3 | 5 | 4 | 7 |
| 4000 | 3 | 6 | 4 | 8 |

Figures 36, 37:
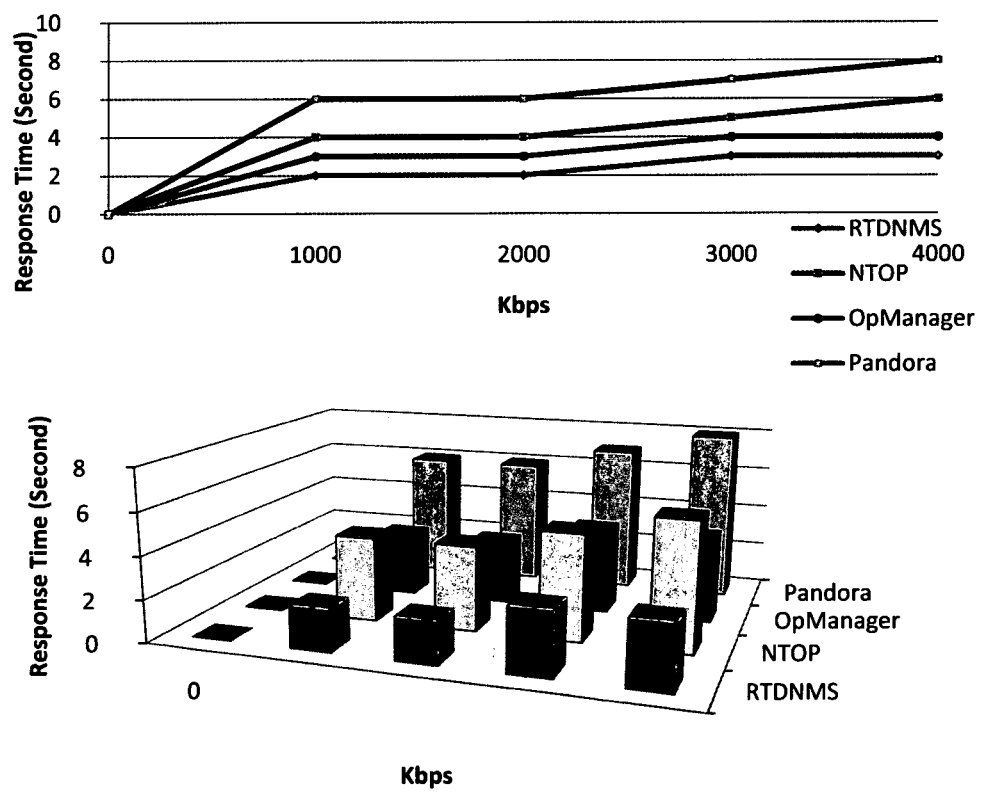
FIG. 36 shows the response time calculation formula
FIG. 37 shows the response time evaluation results

The response time of the RTDNMS based applications is almost same as the response time of the "OpManager", where "NTOP" requires more time to reply each query; because "NTOP" need to parse the received query to extract the results. On the other hand, "OpManager" require less time compare to "NTOP" to parse the received query and extract the requested information. "Pandora" require more time as it depends on the flow analysis. "Pandora" needs to aggregate the traffic into flows which require more time to prepare the results. The RTDNMS will directly receive the parsed and extracted result as the processing is handled by the monitoring element. FIG. 37 illustrates the response time between the RTDNMS, "NTOP", "OpManager" and "Pandora".

Figure 38:
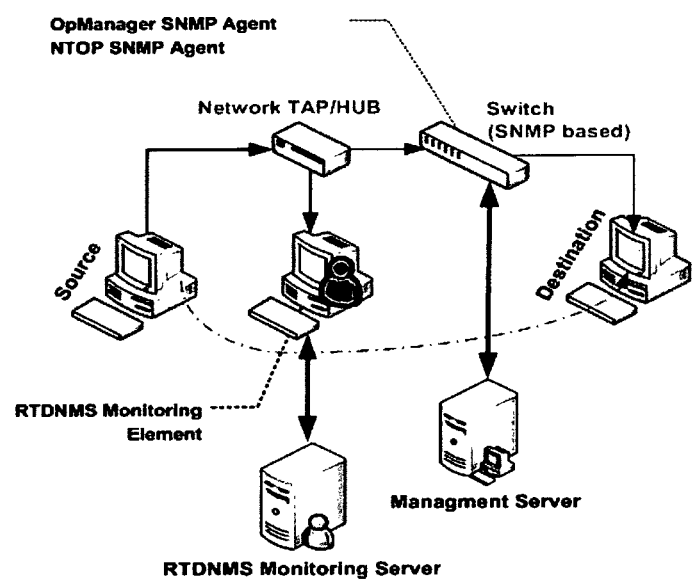
FIG. 38 shows the packet loss testing environment

The purpose of this experiment is to evaluate the amount of the packet loss during the peak hours. The results are then compared to the amount of the packet loss from "NTOP" and "OpManager". The amount of the packet loss indicates the accuracy of the monitoring. Thus, the same environment used in the previous test is used for this purpose as depicted in FIG. 38.

Figure 39:
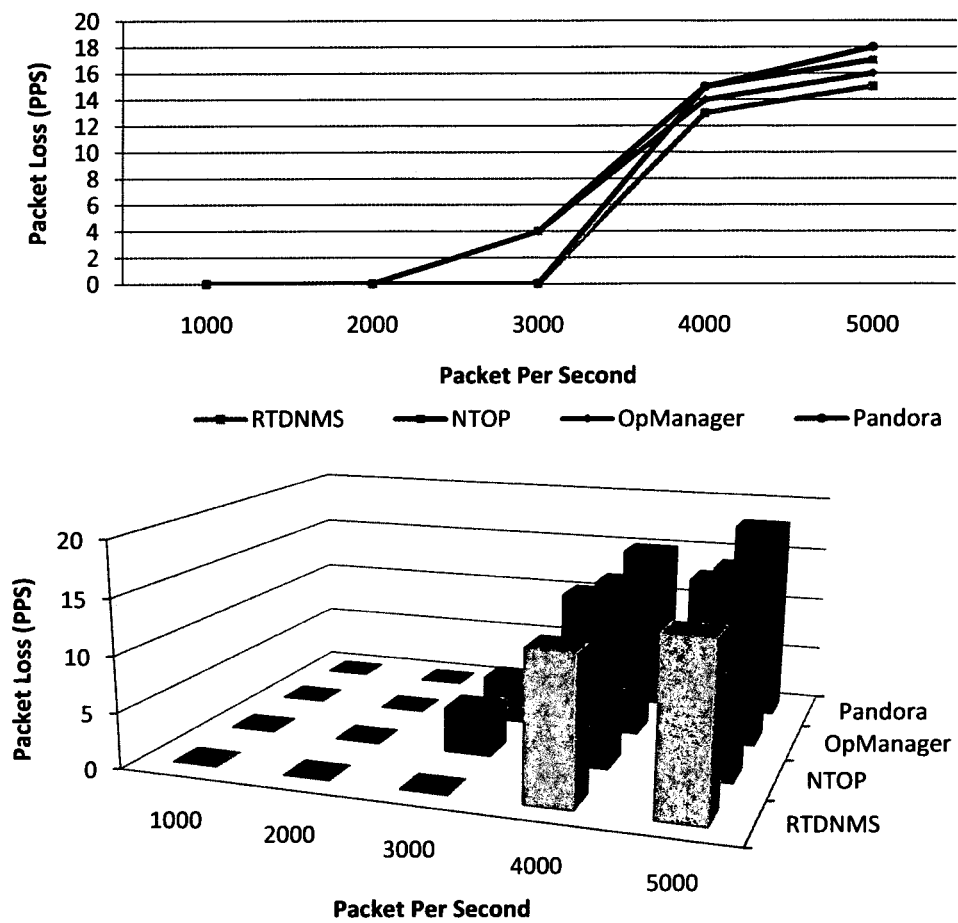
FIG. 39 shows Packet Loss evaluation results

UDP traffic with various rates per second is generated from the "Source" PC to the "Destination" PC. After the traffic is generated, a number of requests were issued by both the monitoring server and the management server to compare the impact of the monitoring element in handling multiple requests against the number of dropped packets. The results in quantifying the amount of packet loss are detailed in table 5 and FIG. 39.

TABLE 5

Packet loss evaluation results

| PPS | RTDNMS Packet Loss (PPS) | NTOP Packet Loss (PPS) | OpManager Packet Loss (PPS) | Pandora Packet Loss (PPS) |
|---|---|---|---|---|
| 1000 | 0 | 0 | 0 | 0 |
| 2000 | 0 | 0 | 0 | 0 |
| 3000 | 0 | 4 | 4 | 0 |
| 4000 | 13 | 15 | 13 | 15 |
| 5000 | 15 | 18 | 17 | 18 |

"NTOP" requires more processing then the RTDNMS monitoring element and "OpManager". Thus, this processing time resulted in more packet loss compare to the RTDNMS monitoring elements and the "OpManager". The "OpManager" will start losing packets whenever the switch is loaded with traffic i.e depends on the switch overhead. The reason behind "OpManager" losing packet is due to the fact that the SNMP agent will be busy processing the management server requests and at the same time need to process the incoming traffic. The RTDNMS monitoring element shows promising results because it utilises two different operating system processes for requests handling and traffic processing as discussed earlier in chapter 3. Moreover, the RTDNMS monitoring elements utilizes the innovative buffering structure in handling network traffic beside the communication pool that used to handle the different requests to the RTDNMS based applications. "Pandora" packets loss is almost similar to the results achieved by the RTDNMS monitoring elements due to the fact that "Pandora" is depending on flow analysis.

The RTDNMS platform supports an innovative buffering technique to minimize the packet loss ratio during the peak hours. Thus, the purpose of this experiment is to evaluate the performance of the innovative buffering structure as well as quantifying the amount of the packet loss in supporting real time network traffic monitoring.

Figure 40:
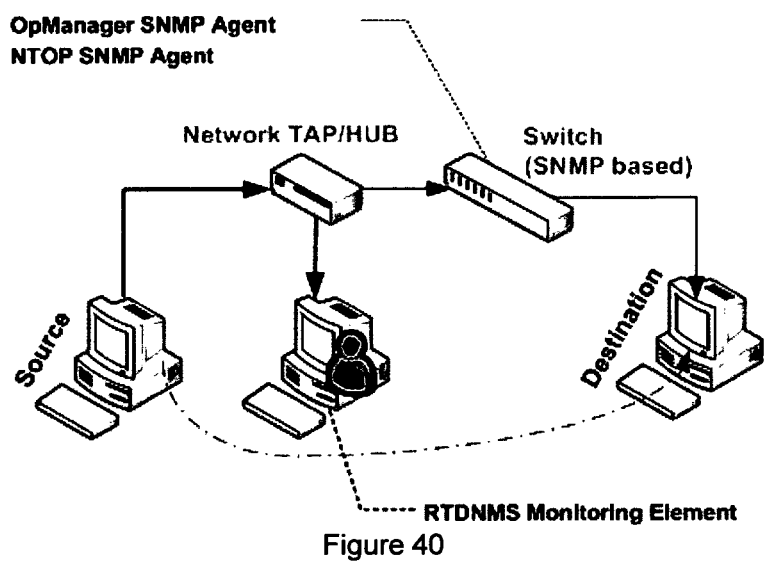
FIG. 40 shows the buffering performance test environment

The experiment environment in FIG. 40 consists of three PCs, a Gigabit switch "3Com 5000" and a network TAP/HUB. The "Source" PC (equipped with a 1 GHz Pentium III) is connected to the network TAP/HUB that splits the generated traffic into the "monitoring element" PC that is also connected to the tapped port of the network TAP. The "Destination" PC (equipped with 2.8 GHz Pentium IV) is connected directly the switch. A random amount of traffic is generated from the "Source" PC to the "Destination" PC using the Commview and iperf packet generators. The "monitoring element" PC is an Intel® Core™ 2 Duo CPU E6750 @ 2.66 GHz (2 CPU) with 1 GB of main memory, with Intel® 82566DM-2 Gigabit Network card. The "monitoring element" PC operating system is windows XP professional (5.1 build 2600).

A random traffic is generated at various rates per seconds for a period of one minute to stress the buffering mechanisms as table 6 illustrates.

TABLE 6

Memory Buffer Experimental Results

| PPS | Packets per minute | RTDNMS Packet Loss for 60 s | NTOP Packet Loss for 60 s | OpManager Packet Loss for 60 s | Pandora Packet Loss for 60 s |
|---|---|---|---|---|---|
| 500 | 30000 | 0 | 0 | 0 | 0 |
| 1000 | 60000 | 0 | 0 | 0 | 0 |
| 1500 | 90000 | 0 | 0 | 0 | 0 |
| 2000 | 120000 | 0 | 0 | 0 | 0 |
| 2500 | 150000 | 0 | 0 | 0 | 0 |
| 3000 | 180000 | 0 | 50 | 0 | 0 |
| 3500 | 210000 | 131 | 137 | 30 | 131 |
| 4000 | 240000 | 159 | 163 | 36 | 162 |
| 4500 | 270000 | 182 | 191 | 41 | 183 |
| 5000 | 300000 | 230 | 281 | 48 | 249 |

Figure 41:
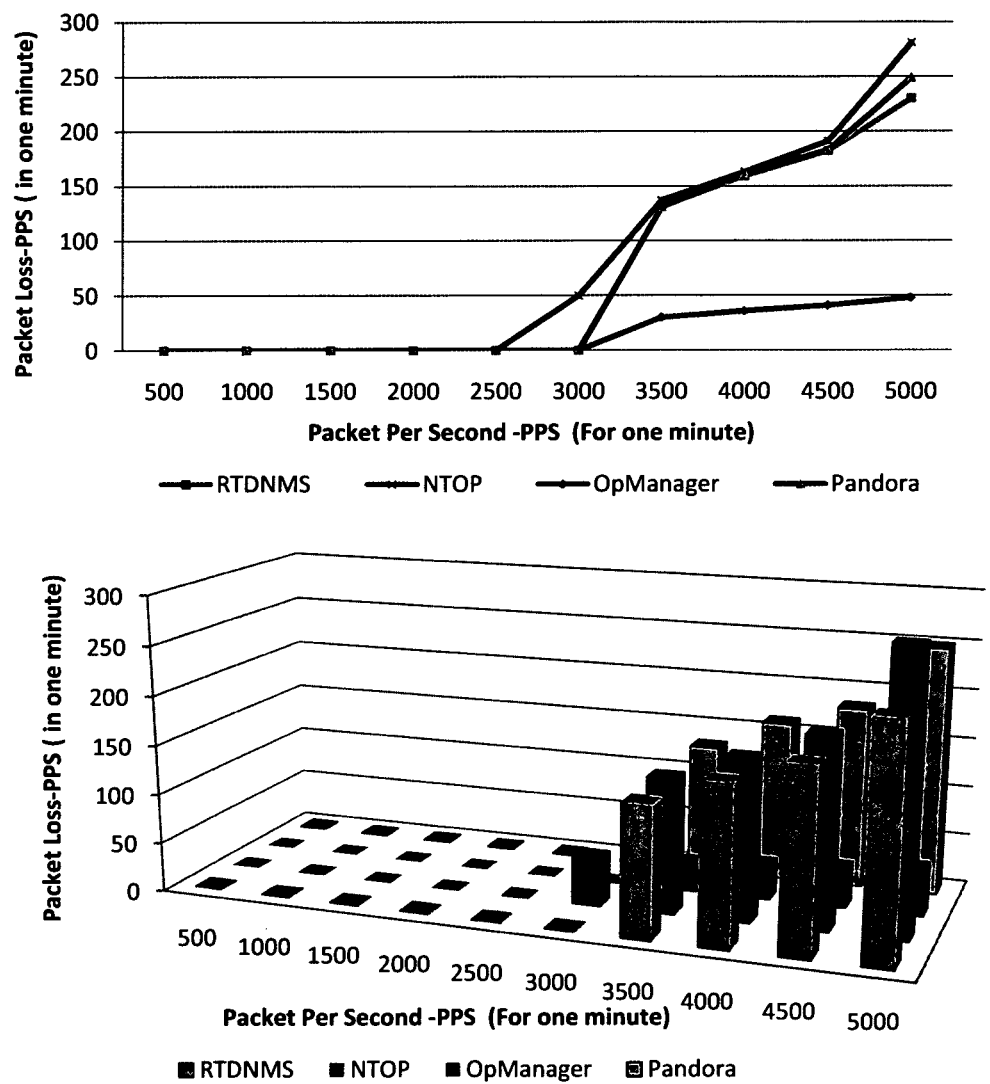
FIG. 41 shows memory buffer experimental results

The proposed buffering mechanism can capture packets without any packet loss up to 3000 packet per second which is similar to "Pandora" and "OpManager". "NTOP" will lose 50 packets out of 180000 packets. But for higher speed packets, our proposed buffering structure will start losing packets. In contrast with "NTOP", our innovative buffering structure outperformed the "NTOP" buffering mechanism. As for "OpManager" the buffering is mainly implemented in a switch firmware; which is faster than the proposed innovative buffering structure in this thesis. In contrast with "Pandora" the innovative buffering structure is almost the same as the "Pandora" buffering structure. FIG. 41 shows that the RTD-NMS innovative buffering structure is performing very well under a high traffic with minimal packet loss.

The invention claimed is:

1. A platform to support real time passive distributed network monitoring and security monitoring applications comprising:
- a centralized coordination system for a network with distributed intelligent analysis of data, wherein the centralized coordination system comprises a centralized coordination server, a plurality of sub-networks operatively coupled to the centralized coordination server, and a distributed monitoring element operatively connected within each of the sub-networks and configured to passively gather real-time data from distributed nodes of the sub-network and to communicate with the centralized coordination server without causing additional processing overhead to the sub-network;
- wherein said platform is configured to allow other applications to add and/or extend functionality to the platform,
- wherein the platform is further configured to provide a scalable real time network system;
- wherein the centralized coordination system is configured to capture each data packet in the network; and
- wherein the platform is designed to minimize real time packet capturing loss and system overhead by reducing calls between kernel and user level memory.

2. The real time passive distributed network monitoring and security monitoring applications as claimed in claim 1 wherein the distributed monitoring and security monitoring covers both distributed network and core network devices.

3. The real time passive distributed network monitoring and security monitoring applications as claimed in claim 1 wherein data are collected by the distributed monitoring elements across a network the network thus reducing the bandwidth consumed.

4. The real time passive distributed network monitoring and security monitoring applications as claimed in claim 1 wherein a high speed memory buffering technique is provided to capture and process fast distributed network data.

5. The real time passive distributed network monitoring and security monitoring applications as claimed in claim 1 wherein the platform provides a set of application programmer interface to ease the task of developing an optimal distributed network monitoring application.

6. The real time passive distributed network monitoring and security monitoring applications as claimed in claim 1 wherein the platform is configured to monitor a link between a distributed sub network and the internet or the whole sub network or an internal sub network node.

7. The real time passive distributed network monitoring and security monitoring applications as claimed in claim 1 wherein the platform includes a buffering structure which is a combination of a memory buffering and a ring base file buffering.

8. The real time passive distributed network monitoring and security monitoring applications as claimed in claim 7 wherein the memory buffering and ring base buffering provided in the platform is a hybrid approach to avoid data packet loss.

* * * * *